United States Patent
Potyrailo et al.

(10) Patent No.: US 7,653,919 B2
(45) Date of Patent: Jan. 26, 2010

(54) OPTICAL ARTICLE HAVING ANTI-THEFT FEATURE AND A SYSTEM AND METHOD FOR INHIBITING THEFT OF SAME

(75) Inventors: Radislav Alexandrovich Potyrailo, Niskayuna, NY (US); Marc Brian Wisnudel, Clifton Park, NY (US); Jerry Apffel Pierce, Redwood City, CA (US); Kenneth Brakeley Welles, II, Scotia, NY (US); Kyle Erik Litz, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 451 days.

(21) Appl. No.: 11/286,413

(22) Filed: Nov. 21, 2005

(65) Prior Publication Data

US 2007/0114365 A1  May 24, 2007

(51) Int. Cl.
*G11B 3/70* (2006.01)
*G11B 7/252* (2006.01)

(52) U.S. Cl. .................. 720/718; 369/273; 369/15; 340/572.1

(58) Field of Classification Search ............. 369/275.4, 369/275.5, 283, 288, 273, 15; 720/718, 719, 720/728, 745; 705/18; 206/308.1; 340/572.1, 340/572.3, 572.7, 572.8; 235/382, 382.5
See application file for complete search history.

(56) References Cited

U.S. PATENT DOCUMENTS

| | | | |
|---|---|---|---|
| 6,790,501 B2 | 9/2004 | Van de Grampel et al. | |
| 7,417,713 B2 * | 8/2008 | Smith et al. | 355/67 |
| 2003/0081521 A1 | 5/2003 | Solomon et al. | |
| 2003/0085288 A1 * | 5/2003 | Luu | 235/492 |
| 2003/0174616 A1 | 9/2003 | Constantinou et al. | |
| 2004/0054594 A1 | 3/2004 | Forster et al. | |
| 2004/0083377 A1 | 4/2004 | Wu et al. | |
| 2004/0233042 A1 * | 11/2004 | Piccoli et al. | 340/10.1 |
| 2005/0005285 A1 | 1/2005 | Olson et al. | |
| 2005/0110978 A1 | 5/2005 | Potyrailo et al. | |
| 2006/0227696 A1 * | 10/2006 | Smith et al. | 369/275.1 |
| 2007/0114366 A1 * | 5/2007 | Wisnudel et al. | 250/221 |
| 2007/0114621 A1 * | 5/2007 | Wisnudel et al. | 257/414 |
| 2007/0141293 A1 * | 6/2007 | Wisnudel et al. | 428/64.2 |
| 2007/0231743 A1 * | 10/2007 | Selinfreund et al. | 430/270.15 |
| 2008/0012430 A1 * | 1/2008 | Peters et al. | 307/131 |

(Continued)

FOREIGN PATENT DOCUMENTS

EP      809245 A2 * 11/1997

(Continued)

OTHER PUBLICATIONS

PCT International Search Report dated May 8, 2007.

*Primary Examiner*—William J Klimowicz
(74) *Attorney, Agent, or Firm*—Richard A. DeCristofaro

(57) ABSTRACT

An optical article that can transform from a pre-activated state of functionality to an activated state of functionality is provided. The optical article includes a radio frequency circuitry coupled to the optical article for interacting with a signal, wherein the signal comprises a thermal signal, an electrical signal, or both, and a convertible material in operative association with the radio frequency circuitry for altering the functionality of the optical article from the pre-activated state to the activated state upon interaction with the thermal energy.

18 Claims, 10 Drawing Sheets

U.S. PATENT DOCUMENTS

2008/0018886 A1 * 1/2008 Wisnudel et al. ......... 356/237.1

FOREIGN PATENT DOCUMENTS

| GB | 2354834 A | * | 4/2001 |
| --- | --- | --- | --- |
| JP | 05147378 A | * | 6/1993 |
| JP | 2001210057 A | * | 8/2001 |
| JP | 2003058840 A | * | 2/2003 |
| JP | 2005085418 A | * | 3/2005 |
| JP | 2005235281 A | * | 9/2005 |
| WO | WO9811539 A1 | | 3/1998 |
| WO | WO 9941738 A1 | * | 8/1999 |
| WO | WO2004044911 A2 | | 5/2004 |
| WO | WO2004/070718 | | 8/2004 |

* cited by examiner

OPTICAL ARTICLE HAVING ANTI-THEFT FEATURE AND A SYSTEM AND METHOD FOR INHIBITING THEFT OF SAME

BACKGROUND

The invention relates generally to optical articles. More particularly, the invention relates to anti-theft features for an optical article and methods of making same.

Shoplifting is a major problem for retail venues and especially for shopping malls, where it is relatively difficult to keep an eye on each customer while he shops or moves around in the store. Relatively smaller objects, such as CDs and DVDs are easy targets as they can be easily hidden and carried out of the shops without getting noticed. Shops, as well as the entertainment industry, incur monetary losses because of such instances. Due to the sensitive nature of the information stored inside, this problem become more severe if the CDs or DVDs are stolen from places like offices.

Even though close circuit surveillance cameras may be located at such places, shoplifting or stealing still occurs. Consumable products sometimes are equipped with theft-deterrent packaging. For example, clothing, CDs, audio tapes, DVDs and other high-value items sometimes are packaged along with tags that set off an alarm if the item is removed from the store without being purchased. These tags are engineered to detect and alert for shoplifting. For example, tags that are commonly used to secure against shoplifting are the Sensormatic® electronic article surveillance (EAS) tags based on acousto-magnetic technology. RFID tags are also employed to trace the items in store shelves and warehouses. Other theft-deterrent technologies currently used for optical discs include special hub caps for DVD cases that lock down the disc and prevent it from being removed from the packaging until the it is purchased, and "keepers" that attach to the outside of the DVD case packaging and also prevent the opening of the package until it is purchased. In some cases, retailers have resorted to storing merchandise in locked glass display cases. In other stores, the DVD cases on the shelves are empty, and the buyer receives the actual disc when the movie is purchased. Many of these approaches are unappealing in that they add an additional inconvenience to the buyer or store owner or they are not as effective at preventing theft as desired. Optical storage media, in particular, pose an additional problem in that they are very easy to remove from their packaging and the sensor/anti-theft tags may be removed easily.

SUMMARY

Figure 1:
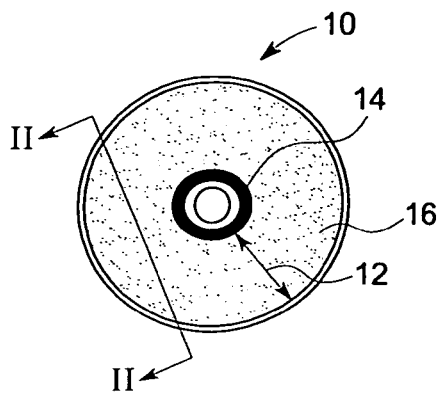
FIG. 1 is a schematic view of an optical storage medium having a convertible material disposed thereon and in one of the two functionality states in accordance with an exemplary embodiment of the invention.

Embodiments of the invention are directed to an optical article having an anti-theft feature and a method for inhibiting theft of the same.

One exemplary embodiment of the invention is an optical article for being transformed from a pre-activated state of functionality to an activated state of functionality. The optical article includes an optical data layer for storing data and radio frequency circuitry coupled to the optical article and interacting with an external stimulus for generating a signal, wherein said signal comprises a thermal signal, an electrical signal, or both. The optical article also includes a convertible material disposed in or proximate to the optical article. The convertible element is in optical communication with the optical data layer. The convertible material is in operative association with the radio frequency circuitry, alter the functionality of the optical article from the pre-activated state to the activated state upon interaction with the thermal energy. The data is read from the optical data layer in the activated state of functionality.

Another exemplary embodiment of the invention is an optical article for being transformed from a pre-activated state of functionality to an activated state of functionality. The optical article includes an optical data layer for storing data, and a detachable label having an adhesive disposed thereon, wherein a bond strength of the adhesive is altered upon interaction with an external stimulus. The detachable label is disposed in or proximate to the optical article and is responsive to the external stimulus. The label is in optical communication with the optical data layer, where the detachable label alters the optical article from the pre-activated state of functionality to the activated state of functionality upon interaction with the external stimulus.

Another exemplary embodiment is a system for altering functionality of an optical article from a pre-activated state to an activated state. The system includes an optical article having an optical data layer for storing data, radio frequency circuitry coupled to the optical article, an external radiation source for generating a signal, wherein said signal comprises a thermal signal, an electrical signal, or both, and a convertible material disposed in or proximate to the optical article. The convertible material in operative association with the radio frequency circuitry for altering the functionality of the optical article from the pre-activated state to the activated state upon interaction with the signal. The data is read from the optical data layer in the activated state of functionality.

Another exemplary embodiment is a method for altering a functionality of an optical article. The method includes providing an optical article having a radio frequency circuitry coupled to the optical article, and a convertible material disposed in or proximate to the optical article. The method also includes exposing the radio frequency circuitry to external stimulus to alter a property of the convertible material and isolating the radio frequency circuitry from the optical article.

Another exemplary embodiment is a method for selling an optical article including receiving an optical article and conducting a monetary transaction. The optical article includes a radio frequency circuitry, an optical data layer for storing data, and a convertible material disposed in or proximate to the optical article, wherein the convertible material is in operative association with the radio frequency circuitry. The data is read from the optical data layer in the activated state of functionality.

These and other advantages and features will be more readily understood from the following detailed description of preferred embodiments of the invention that is provided in connection with the accompanying drawings.

DETAILED DESCRIPTION OF EXEMPLARY EMBODIMENTS

Embodiments of the invention relate to an optical article having an anti-theft feature to inhibit theft or un-authorized use of the optical article. As used herein, the term "optical article" refers to an article that includes an optical data layer for storing data. The stored data may be read by, for example, an incident laser. The optical data layer may include one or more layers. Further, the optical data layer may be protected by employing a protective outer coating. The protective outer coating is transparent to the incident laser, that is, the protective outer coating allows the incident laser to pass through and reach the optical data layer.

The optical article may be an optical storage medium, such as a compact disc (CD), a digital versatile disc (DVD), multi-layer structures, such as DVD-5 or DVD-9, multi-sided structures, such as DVD-10 or DVD-18, a high definition digital versatile disc (HD-DVD), a blu-ray disc, a near field optical storage disc, a holographic storage medium, or another like volumetric optical storage medium, such as, for example, two-photon or multi-photon absorption storage format. As will be described in detail below, if the optical article is taken out of its packaging without being authorized, or if the optical article is attempted to be played without being authorized, the anti-theft feature may render the article un-readable or readable only for a finite period of time before making it permanently unreadable.

In other embodiments, the optical article may also include an identification card, a passport, a payment card, a driver's license, a personal information card, or other security documents, all of which employ an optical data layer for data storage. As will be described in detail below, in these embodiments, the anti-theft feature renders the article unreadable by the reader until it is processed prior to being issued to the concerned authority. Hence, if the article is stolen before being issued, the data in the optical data layer is not readable and therefore the article is prevented from any un-authorized use before issuance.

In embodiments of the invention, the optical article may be transformed from a pre-activated state of functionality to an activated state of functionality. This conversion from the pre-activated state to the activated state is performed while authorizing the optical article for use. Data is read from at least a portion of the optical data layer in the activated state of functionality. Data may or may not be read from at least a portion of the optical data layer in the pre-activated state of functionality. A convertible element is disposed in or proximate to the optical article. The convertible element may alter the state of functionality of the optical article from the pre-activated state to the activated state. The convertible element changes the state of functionality of the optical article by interacting with one or more external stimulus. In some embodiments, the convertible element is capable of irreversibly altering the state of functionality of the optical article. Further, the convertible element is in optical communication with the optical data layer.

As used herein, the "pre-activated state" of functionality refers to a state of functionality of the optical article where the convertible element has not yet been exposed to one or more external stimulus as will be described in the various embodiments of the invention. In the pre-activated state, the optical article may or may not be readable, that is, in the pre-activated state the data on the optical data layer may or may not be read by the incident laser.

In an exemplary embodiment, some or all of the portions of the optical data layer may not be read by the incident laser in the pre-activated state. For example, the convertible element may alter the optical property of the optical data layer in certain portions and make the data in these portions un-accessible to the incident laser. In embodiments where the data in some portions of the optical data layer is unreadable, the optical article when played in the player may result in undesirable noise or disturbances when the data is attempted to be read from these unreadable portions, while the other portions may be read without disturbances.

Alternatively, making some portions unreadable may lead to the whole optical article being unreadable. CDs and DVDs may utilize an error-correction scheme to correct for imperfections in or on the disc, such as replication imperfections, dust, fingerprints, and poor mastering of the data. One error detection and correction code used on CDs is called the Cross Interleave Reed-Solomon Code (CIRC). CDs use data redundancy and interleaving to detect and correct errors. The CIRC error correction used in CD drives and players is composed of two stages called C1 and C2 with de-interleaving of data between the stages.

Generally, a drive can detect and correct two bad symbols per block in the first stage and three or four bad symbols per block in the second stage (depending on the drive). Hence, errors can be described as C1 correctable if they are corrected in the first stage and C2 correctable if they are corrected in the second stage. An E11 error means one bad symbol was corrected in the first stage, E21 means two bad symbols were corrected in the first stage. E31 means three bad symbols were present in the first stage; this block is uncorrectable at the C1 stage and so is passed to the second stage. E12 means one bad symbol was corrected in the second stage and E22 means two bad symbols were corrected in the second stage. E32 means there were 3 or more bad symbols in the second stage. Some drives can correct up to 4 bad symbols at the second stage. If the error cannot be corrected in the second stage, it generally results in an uncorrectable error.

DVD players use a different error correction protocol based on a Reed Solomon product code. A block of data is examined using parity rows and columns. In this case, if there are six bad bytes in a row, the row is flagged as a PI (inner parity) failure or error. The raw data may still be recovered using outer parity bytes. If there are more than seven bad bytes in a column, the column is flagged as a PO (outer parity) failure or error. Blocks that are flagged as PO failures are unusable and data is lost.

The impact of the convertible element on error type (C1, C2, or uncorrectable error in the case of CD and PI or PO failure errors in the case of DVD) will be a function of the disc format, the number of convertible elements, and the density and physical placement of the convertible elements. Hence, in one state, the convertible element can induce a C1 error, C2 error, PI error, PO error, an uncorrectable error, a bad sector, or the like, as well as combinations comprising at least one of the foregoing. The convertible element may also cause one data bit to change data state relative to a predetermined data state.

In other embodiments, the data of the optical data layer may be readable in the pre-activated state, but only for a definite period of time. Consequently, after the definite time period elapses, the data of the optical layer may become unreadable for the incident laser. As will be described in detail below, in such cases, the convertible element may alter the optical property of the optical article and render at least a portion of the optical data layer unreadable after the definite period of time, such that the optical article may self destroy, that is, become unreadable, once the definite period of time elapses. Contrary to the pre-activated state, the "activated state" of functionality of the optical article refers to the state where the optical article has been exposed to one or more external stimulus as will be described with regard to various embodiments of the invention. In the activated state of functionality, the data in the optical data layer is readable by the laser. In other words, the optical article may be read without any noise or disturbances, which may otherwise have been present in the pre-activated state.

When an optical article goes into an "activated state", a measured optical parameter changes from its first optical value to a second optical value where the change in optical value results in a change in the error state of a sector or multitude of sectors on a disc. The variety of optical signals include those that affect the readout from the disc. These signals are layer reflectivity, that includes single or dual layer reflectivity, refractive index, in-plane birefringence, polarization, scattering, absorbance, thickness, optical pathlength, position, and any other affecting the signals. The nature of these signals originates from the several intrinsic light parameters that affect the signal measured by the detector assembly of the optical disc reader. These intrinsic light parameters include light intensity, directionality, polarization, and phase.

The change in optical properties of the optical article upon exposure to an energy source, e.g., from the activation system, can appear in any manner that results in the optical data reader system receiving a substantial change in the amount of energy detected. For example, where the dye is initially opaque and becomes more transparent upon exposure, there should be a substantial increase in the amount of light reflected off of the storage layer and transmitted through the content access layer and the optional optically transparent layer. Most dye compounds typically change (reduce) the amount of incident radiation detected by means of selective absorption at one or more given wavelengths of interest (corresponding to the type of electronic storage device data reader system energy source). However, energy absorbance by the dye compound is not the only way to effect an optical property change.

Most optical article reader system detectors are specifically designed to detect at least a certain intensity of radiation, reflected at a narrow set of wavelengths and/or frequencies surrounding the emitted wavelength(s) and/or frequency(ies), and usually in a particular polarization state. Therefore, besides absorbing the incident energy wavelength(s), the dye compound(s) and/or the dye composition may additionally or alternately accomplish any one or more of the following: change the polarization state of the incident energy; alter the frequency/wavelength of the incident energy; change the path of the incident energy, whether through reflection, refraction, scattering, or other means such that some portion of the energy is directed (and/or reflected off of the storage layer) away from the electronic storage device data reader system detector. For instance, in optical readers for DVDs (specifically for the DVD-5 format), the detector will typically read an error at least about 90% of the time when less than about 20% of the incident laser light reaches the detector, and the detector will typically read an error at least about 99% of the time when less than about 10% of the incident laser light reaches the detector. However, the detector will also typically read an error less than about 2% of the time when at least about 45% of the incident laser light reaches the detector. Thus, any dye compound/composition that can be alternated between these extremes of opacity and transparency at the given incident wavelength(s) upon exposure to energy of the same incident wavelength(s) is appropriate for use in content access layers, as described herein.

In certain embodiments, the convertible element may render an optical state change from the pre-activated state to the activated state. The optical change may include a change in an optical property, such as reflectivity, single layer reflectivity, dual layer reflectivity, refractive index.

In certain embodiments, the difference between the optical signals from at least a portion of the optical data layer in the pre-activated state of functionality and the activated state of functionality is at least about 15 percent. For example, the difference in the percent reflectivity values or the percent transmittance values of at least a portion of the optical article for an incident laser in the activated versus the pre-activated states may be at least about 15 percentage points. In the activated state, the reflectivity may be 15 percentage points higher or lower, or the transmittance may be 15 percentage points lower or higher, with respect to their respective values in the pre-activated state.

In embodiments where the optical article includes a DVD, the pre-activated state of functionality is characterized by an optical reflectivity of at least a portion of the optical article being less than about 45 percent. In these embodiments, the data in the optical data layer of the optical storage medium is not readable or is only partially readable in the pre-activated state. It should be appreciated that any portion of the optical article that has an optical reflectivity of less than about 45 percent may not be readable by the player. In some embodiments, the optical reflectivity of at least a portion of the optical article in one of the pre-activated or the activated state may be less than about 45, or less than about 20 percent, or less than about 10 percent. Further, in other embodiments, the activated state is characterized by an optical reflectivity of at least a portion of the optical article being more than about 45 percent. In some embodiments, the optical reflectivity of the optical article in both the pre-activated and activated states is more than about 45 percent, that is, the optical article is readable in both the pre-activated and the activated state. However, as noted above, in these embodiments the optical article is readable only for a definite period of time in the pre-activated state and is readable for an indefinite period of time in the activated state.

It should be appreciated that there are analogous predetermined values of optical properties for activating different optical articles. For example, for DVD-9 (dual layer) media, the specified (as per ECMA-267) minimum optical reflectivity is 18 percent to 30 percent and is dependent upon the layer (0 or 1). Alternatively, where the modified optical property is birefringence of the optical substrate, the specified maximum allowable birefringence for a playable DVD is 100 nm. Therefore, in a pre-activated DVD, the birefringence may be more than about 100 nm, or more than about 150 nm, or preferably more than about 200 nm. In the activated state, the birefringence of the optical substrate is less than 100 nm. Alternatively, where the modified optical property is refractive index of the optical substrate, the specified refractive index range for a playable DVD is 1.45 to 1.65. In one exemplary embodiment, the refractive index of the optical substrate in the pre-activated state is 1.65, more preferably 1.70 and even more preferably 1.75. In the activated state, the refractive index of the optical substrate is in a range from about 1.45 to about 1.65.

The convertible element may render the optical article partially or completely unreadable in the pre-activated state of functionality of the optical article. In the pre-activated state, the convertible element may act as a read-inhibit layer by inhibiting the laser from reaching at least a portion of the optical data layer and reading the data on the optical data layer. For example, the convertible element may absorb a major portion of the incident laser, thereby impeding it from reaching the optical data layer to read the data.

Upon interaction with one or more external stimulus, the optical property of the convertible element may be altered to change the functionality of the optical article from the pre-activated state to the activated state. For example, in the pre-activated state, the convertible element may render the optical article un-readable by changing the optical reflectivity of the optical article for the incident laser. However, the convertible element upon interaction with external stimulus becomes transparent to the wavelength of the laser used to read the optical article, thereby making the optical article readable in the activated state.

Alternatively, the convertible element may reflect the incident laser before the laser reaches the optical data layer. In this way, the convertible element prevents the laser from reading the data in the optical data layer. Upon interaction with the external stimulus, the convertible element allows the incident laser to pass through, and reach the optical data layer to read the data.

Alternatively, if an attempt is made to use the optical article in the pre-activated state, that is, if an attempt is made to use the optical article without interacting the convertible element with an external stimulus, the convertible element may render readability for only a set period of time to the optical article. For example, the convertible element may alter the reflectivity of at least a portion of the optical article after the set period, such that the optical article becomes partially or completely unreadable, after the set period. In other words, the optical article may be readable only in certain portions after the set period of time. Alternatively, the optical article may self-destruct after the set period of time limit. The self-destruction may be initiated by, for example, exposure to elements, such as air or light, or both, at room temperature. In this way, if the user takes out, for example, an optical storage medium from its packaging without first getting it exposed to the external stimulus, the optical storage medium is exposed to such elements which render it unreadable. In some cases, upon exposure to room temperature elements, the optical article may be initially readable, but subsequently self-destructs itself after a given period of time The convertible element may be disposed in or proximate the optical article in various forms. For example, the convertible element may be disposed in a discrete area on the optical article, such as an individual patch, a continuous layer extending across a portion of a surface of the optical article, or as a patterned layer extending across a portion of the optical article.

Alternatively, instead of being disposed on the surface of the optical article, the convertible material may be disposed inside the structure of the optical article. In optical storage medium, the convertible material may be disposed in the substrate on which the optical data layer is disposed. In such an embodiment, the convertible material may be mixed with the substrate material of the optical article. In alternate embodiments, the convertible material may be disposed between the layers of the optical article, or may be disposed within the layers of the optical article. In an exemplary embodiment, the convertible material may be mixed with a polycarbonate to form the substrate for the optical storage medium. As used herein, the term "polycarbonate" refers to polycarbonates incorporating structural units derived from one or more dihydroxy aromatic compounds and may include co-polycarbonates and polyester carbonates. It should be appreciated that these dyes should be thermally stable to withstand the molding temperatures of up to about 380° C. of the optical article. Also, these dyes may preferably absorb the wavelength of the laser in one of the activated, or the pre-activated state of the optical article. For example, dyes, such as acid blue 129, acid blue 45, acid blue 48, acid blue 74, acid blue 80, solvent green 3, disperse blue 3, disperse blue 134, disperse blue 14, basic blue 3, Indigo blue, solvent blue 2, solvent blue 4, solvent blue 6, solvent blue 14, solvent blue 68, solvent violet 8, basic violet 4, solvent violet 38, acid black 48, may be mixed with the polycarbonate to form the substrate. Upon interaction with external stimulus, the dye present inside the substrate changes color. As a result, the substrate may become transparent to the laser light, thereby facilitating the transmittance of laser light through the substrate and making the optical article readable.

The convertible element may include a convertible material that changes optical property in response to the external stimulus. For example, the convertible material may include one or more of a color-shift dye, a photo-chromic material, a photovoltaic material, a magnetic material, an electro-chromic material, or a thermo-chromic material, a magneto-optical material, a photo-refractive material, a light scattering material, a phase-change material, dye aggregates, nanoparticles. The color-shift dye may refer to a material, which may change from a first color to a second color upon interaction with an external stimulus, such that the first color, second color, or both are transparent to the incident laser. In some embodiments, the color-shift dye may include a bleachable dye, which bleaches upon interaction with the external stimulus, thereby becoming transparent to the incident laser. In some embodiments, the color-shift dye may darken upon interaction with the external stimulus, thereby absorbing the incident laser light. In other embodiments, the color-shift dye may include an aryl carbonium dye, thiozine, spyropyran, fulgide, diarylethene, liquid crystal, leuco dye, or a hydroquinone-based compound, or other suitable chemical compounds prepared by one skilled in the art.

The change in optical properties of the optical article upon exposure to the external stimulus may result in the optical data reader system receiving a substantial change in the amount of energy detected. For example, there may be a substantial increase in the amount of light reflected off of the optical data layer and transmitted through other layers, such as the content access layer and the optional protective outer coating, in the portions of the optical article where the material of the convertible element is initially opaque to the incident laser and becomes relatively transparent to the incident laser upon exposure to the external stimulus. Most dye compounds typically change (reduce) the amount of incident radiation detected by means of selective absorption at one or more given wavelengths of interest (corresponding to the type of electronic storage device data reader system energy source). However, energy absorbance by the dye compound is not the only way to effect an optical property change.

Most types of optical article reader system detectors are specifically designed to detect at least a certain intensity of radiation, reflected at a narrow set of wavelengths and/or frequencies surrounding the emitted wavelengths and/or frequency, and usually in a particular polarization state. Therefore, besides absorbing the incident energy wavelengths, the convertible element, such as dye compounds and/or the dye composition may additionally or alternately accomplish any one or more changes, such as change in the polarization state of the incident energy, change in the frequency/wavelength of the incident energy, change in the path of the incident energy, whether through reflection, refraction, scattering, or other means such that some portion of the energy is directed (and/or reflected off of the optical data layer) away from the electronic storage device data reader system detector. For example, in optical readers for DVDs (specifically for the DVD-5 format), the detector will typically read an error at least about 90 percent of the time when less than about 20 percent of the incident laser light reaches the detector, and the detector will typically read an error at least about 99 percent of the time when less than about 10 percent of the incident laser light reaches the detector. However, typically the detector may also read an error less than about 2 percent of the time when at least about 45 percent of the incident laser light reaches the detector. Thus, any dye compound/composition that can be alternated between these ranges of opacity and transparency at the given incident wavelength upon exposure to energy of the same incident wavelength is appropriate for use in content access layers.

The external stimulus that interacts with the convertible element may include a laser, infrared radiation, thermal energy, infrared rays, X-rays, gamma rays, microwaves, visible light, ultra violet light, ultrasound waves, radio frequency waves, microwaves, electrical energy, chemical energy, magnetic energy, mechanical energy, or combinations thereof. The interaction with the convertible element may include continuous, discontinuous, or pulsed forms of the external stimulus.

The external stimulus may be selected based on the kind of convertible material. For example, when the convertible material includes a color-shift dye, the external stimulus may be a light source of appropriate wavelength and power to make the color-shift dye transparent to the laser, thereby changing the functionality of the optical article from an unreadable state to a readable state. Further, the power of the light source is sufficient to bleach the color-shift dye. Additionally, the composition of the color-shift dye, as well as the specifications of the power source may be tailored based upon the factors, such as color-shift dye concentration in the convertible material, thickness of the coating of the color-shift dye, or concentration of co-factors or catalysts for the process. In an exemplary embodiment, the convertible material may include organic or inorganic additives in combination with the color-shift dye. These additives may absorb the external stimulus, such as infrared radiation. In an exemplary embodiment, this absorption of the external stimulus by the additives may result in temperature change of the additives. This temperature change may cause local heating in the color-shift dye, thereby making the color-shift dye transparent to the incident laser.

Further, the color-shift dye, such as a photo-bleachable dye, may also be interacted with ultraviolet (UV) light. The wavelength of the UV light may be in a range from about 190 nm to about 400 nm. In another example, visible light having a wavelength in a range from about 400-800 nm may be used to interact with the convertible material to change the state of functionality of the optical article. However, the photo-bleachable dyes may be enabled to absorb the radiation of the incident laser initially. It should be appreciated that the wavelength of the incident laser, i.e, the laser light used to read the optical article is about 780 nm for a CD, about 650 nm for a DVD, about 405 nm for an HD-DVD or a Blu-ray. Hence, the optical article having the photo-bleachable dye may be unreadable in pre-activated state. But becomes readable when the dye is made to interact with sunlight or normal room light prior to interacting it with the external stimulus for activating the optical article. UV light may also be used when the dye is combined with photocatalytic additives, such as titania nanoparticles. For example, one or more photo-bleachable dyes, such as methylene blue, polymethine dye, or malachite green may be exposed to UV light individually or in combination with titania nanoparticles.

In an exemplary embodiment, the reflectivity of the optical article may be reduced to less than 10 percent by depositing a layer having a methylene blue (MB) precursor, such as benzoyl leuco methylene blue (BLMB) in a resin matrix. The formation of MB is triggered by exposure to oxygen and the layer bonds with the optical article in the process. Alternatively, a photosensitive layer may be formed on the optical article by employing aryl carbonium dye precursors such as crystal violet lactone, in combination with photo acid generators (PAG), or aryl carbonium dyes may be used separately to reduce the reflectivity of the optical article. Additionally, colorants may be mixed with these dyes to protect against photo-bleaching with a light source having a broad spectrum of wavelengths and also to limit the amount of dye that needs to be bleached. This facilitates activation of the optical article in a minimum amount of time, thereby adding cost advantage.

Alternatively, an adhesive may be employed as a convertible material. The bond strength of the adhesive may be altered upon interaction with the external stimulus. For example, in the pre-activated state, an element, such as a detachable label, which is opaque to the incident laser, may be coupled to a portion of the optical article by employing the adhesive. Subsequently, upon interaction with the external stimulus the adhesive may lose some or all of its bond strength, thereby facilitating the de-coupling of the element from the optical article, thereby making the optical article readable in the activated state.

Alternatively, one or more thermo-chromic materials may be employed as a convertible material. The thermo-chromic material may be disposed on the optical article in various forms, such as a discrete portion, a continuous film, or a patterned film. During authorization, the thermo-chromic material may be heated using sources such as infrared lamps, laser radiation, Nichrome wire, or by electrical coil, which may be in direct contact with the convertible element or may radiatively or conductively conduct heat to at least a portion of the convertible element. Alternatively, the thermo-chromic material may be subjected to a pulsed thermal energy, such as short single pulses, to render change in the optical property of the thermo-chromic material such that the incident laser may pass through the thermo-chromic material and reach the optical data layer. For example, when the thermo-chromic material is employed in the form of a coating, in a discrete portion, or a pattern, or a continuous layer, the heat may change the color of the thermo-chromic material of the coating and make it transparent to the laser light. In another exemplary embodiment, a non-cured layer or partially cured layer of the convertible material may be cured by subjecting it to infrared radiation and/or a catalyst to make the optical article readable.

In an exemplary embodiment, the chemically sensitive dyes may be employed as convertible material. These dyes may be chemically changed to alter the functionality of the optical article. For example, a pH sensitive dye may be mixed with a volatile amine and a resin to form a coating on the optical article. Consequently, when the optical article is subjected to heat, the amine layer evaporates in the presence of heat, thereby decreasing the pH and increasing reflectivity of the article. Additionally, the resin may be modified to facilitate heat generation to change the pH value of the dye.

In addition to dyes, the convertible material may include particles that absorb the laser that is used to read the optical article. During authorization, the optical article may be exposed to a predetermined laser (which has a wavelength other than the incident laser that is used to read the optical article), which may melt or dissolve these particles so that the incident laser may reach the optical data layer and make the optical article readable in the activated state.

In another exemplary embodiment, the dye may be such that it may be bleached under a vacuum ultraviolet (UV) light source. It should be appreciated that vacuum UV includes a light having a wavelength equal to or less than 190 nm. A vacuum UV light source produces radiation that includes a spectral range of 190 nm and less. In a normal environment, such as in a house, where oxygen is present in the atmosphere, the atmosphere substantially absorbs light below 190 nm. Thus, any light source emitting a light in the wavelength of 190 nm and below will not be able to activate the optical article. In this embodiment, during authorization at a location, such as a point-of-sale location, the optical article may be sealed in a container that has an atmosphere that is free of oxygen and has a light source that emits light in a wavelength of 190 nm and below.

Alternatively, the convertible material may include a UV sensitive photo-refractive polymer or a phase change material. The convertible material may either be disposed on the surface of the optical article or be present in the bulk of the optical article. Further, a grating pattern is imaged in the convertible material to impede the readability of the optical article. At a point-of-sale location the optical article may be optically flooded to erase the grating and make the optical article readable.

In an alternate embodiment, the convertible material may contain a phase change material in which the form of the phase change material can be interchanged between amorphous and crystalline by heating. In one form, such as a crystalline form, the layer inhibits the laser from reaching the optical article, thereby making it unreadable. Whereas, in another form, such as an amorphous form, the convertible material renders the optical article readable. For example, the convertible material may include a chalcogenide, which may be changed from the crystalline state to an amorphous state, and vice versa, by employing a high power laser. Alternatively, the convertible material may include a material that may switch between two or more molecular states with each molecular state having a signature color. The material may be transformed from one molecular state to another by varying parameters such as incident light, or pH, or both.

Further, the convertible material may include convertible material, such as photo-chromic dyes, that may to undergo a change from a first form to the second form when exposed to external stimulus, such as light of a predetermined wavelength. For example, exposure to light may result in a change in chemical structure by the opening or closing of certain bonds within the chemical structure of the material. In these embodiments, the dye may absorb the wavelength of the incident laser (for example, 650 nm for a DVD) in one of the first or second forms and not in the other form. This way, the optical article is unreadable when the convertible material is in one of the first or second forms, but is readable when the convertible material is in the other form. Examples of such convertible material may include silver halides, diarylethenes, fulgides, spiropyrans and their derivatives, crystal violet lactone, polymethine dyes, anthraquinone dyes, azulenium dyes, thiozine dyes such as methylene blue, tellurium oxide, chalcogenide materials, metal azides, isomerizable dyes such as derivates of azobenzene derivatives, and liquid crystals. In other embodiments, where the wavelength of the incident laser may be about 405 nm or about 532 nm, nitrones, or nitrostilbenes based dyes may be employed in the optical article.

Examples of photo-chromic dyes which may undergo a change from a first form to the second form may include spyropyrans such as 1-(2-Hydroxyethyl)-3,3-dimethylindolino-6'-nitrobenzopyrylospiran, 3,3 trimethylindolinobenzopyrylospiran, 1,2-Bis[2-methylbenzo[b]thiophen-3-yl]-3,3,4,4,5,5-hexafluoro-1-cyclopentene,2,3-Bis(2,4,5-trimethyl-3-thienyl)maleic anhydride, 2,3-Bis(2,4,5-trimethyl-3-thienyl)maleimide. Other examples can be found in E. Fischer, Y. Hirshberg, J. Phys. Chem., 1952, 4522; G. H.

Brown, "Techniques of Chemistry, Vol. III, Photochromism", Wiley-Interscience (1971); S. Irie, T. Yamaguchi, H. Nakazumi, S. Kobatake, M. Irie, Bull. Chem. Soc. Jpn., 72, 1139 (1999); M. Irie, Chem. Rev., 100, 1685 (2000) which is incorporated herein by reference. Other examples include spyropyrans such as 1-(2-Hydroxyethyl)-3,3-dimethylindolino-6'-nitrobenzopyrylospiran, 1,3,3-Trimethylindolinobenzopyrylo-spiran, 1,3,3-Trimethylindolino-6'-bromobenzopyrylospiran, 1,3,3-Trimethylindolino-8'-methoxybenzopyrylospiran 1,3,3-Trimethylindolino-β-naphthopyrylospiran, 1,3,3-Trimethylindolinonaphthospirooxazine, and 1,3,3-Trimethylindolino-6'-nitrobenzo-pyrylospiran.

Photochromic diarylethenes include cis-1,2-Dicyano-1,2-bis(2,4,5-trimethyl-3-thienyl)ethane, 1,2-Bis[2-methylbenzo[b]thiophen-3-yl]-3,3,4,4,5,5-hexafluoro-1-cyclopentene, 2,3-Bis(2,4,5-trimethyl-3-thienyl)maleic anhydride, and 2,3-Bis(2,4,5-trimethyl-3-thienyl)maleimide.

Examples of photo-bleachable dye compositions may include dyes with electron donors with polymer matrices. It is preferable that these compositions be coated adjacent to the optical data layer rather than be doped into the polycarbonate substrate. In certain embodiments, the compositions may include one or more of xanthene, thiozine, or oxazine dyes such as methylene blue, toluidine blue, erythrosine B, and eosin Y. Examples of electron donors include organic amines such as triethanol amine, n-phenylglycine, borate salts such as triphenyl-n-butyl borate n-butyrylcholine. Examples of polymer matrices may include, but are not limited to, one or more of polyacrylates such as oligomeric methyl methacrylates, such as Elvacite® 2008, poly(methyl methacrylate)s and/or ammonio methacrylates, such as EUDRAGIT®, poly(alkyl acrylate)s, such as poly(methyl acrylate), poly(alkacrylate)s, poly(alkyl alkacrylate)s, such as poly(ethyl methacrylate) and the like, poly(vinyl alcohol) and/or oligomeric vinyl alcohols, polyvinylpyrrolidone, polyvinyl acetate, polystyrene, polyhydroxy styrene, and the like, and combinations or copolymers thereof.

In another exemplary embodiment, a magneto-optic material is disposed over a portion or the entire surface of the optical article to make the optical article unreadable in the pre-activated state. Subsequently, the optical article is subjected to a combination of electromagnetic radiation and a magnetic field to locally heat areas having the magneto-optic material past the Curie point to render the optical article readable.

In an exemplary embodiment, a magneto-optical layer may be disposed at the surface of the optical article. This magneto-optical layer is polarized so as to distort the reflected signal from the incident laser to make the optical article un-readable in the pre-activated state. Subsequently, during authorization, the layer is de-polarized by applying magnetic fields. Alternatively, the optical article may include a ferro-magnetic thin film disposed thereon. The optical article may be readable upon interacting with a magnetic field. For example, magnetic nanoparticles may be distributed throughout the optical article and locked or confined in their positions in the pre-activated state. Subsequently, upon activation, all the magnetic nanoparticles may be directed to a particular location, for example, around the inner hub of the optical article to make the optical article readable.

Further, patterns, such as patches or stripes having birefringence properties may be disposed on the optical article. These patterns may be reset by exposure to radial magnetic field, thereby making the optical article readable. Alternatively, a metal oxide layer is disposed on the optical article. The metal oxide (MO) layer is not aligned or partially aligned in the pre-activated state of the optical article. That is, the magnetic field of the MO layer is random. In the activated state, the MO layer is aligned by, e.g., applying a magnetic field. Additionally, nanoparticles may be employed in the MO layer to generate heat via eddy currents. It should be appreciated that application of an electric field while heating facilitates alignment of the MO layer, thereby making the optical article readable.

In a mechanical arrangement, the convertible element may include a material, such as a polymer bead, may be employed around the inner hub of the optical article. In certain embodiments, this material may weld the optical article to the packaging unless disabled at the point-of-sale location.

In another embodiment, the convertible element of the optical article includes a release liner that is undercoated with an uncured monomer layer that has a refractive index matching to that of the optical article. In this embodiment, the convertible element may be disposed within the substrate of the optical article. The optical article may contain engineered marks, such as scratches, on the surface, which may be cured or filled upon interaction of the optical article with the external stimulus. For example, the monomer in the convertible element may fill in the marks. The release liner is subsequently cured while authorizing the optical article, for example, at the point-of-sale location. However, if left uncured, the release liner pulls off the monomer back from marks, thereby leaving the optical article unreadable. Alternatively, a substance adapted to etch the optical article if left uncured may be employed in the release liner.

In embodiments of the invention, the optical article, such as an optical storage medium may be disposed in a packaging. The packaging may be modified to allow an external stimulus to be directed toward the material of the convertible element. For example, the external stimulus may be directed toward the convertible material to be bleached by employing a window that is transparent to the external stimulus, while the rest of the portion of the packaging may be semitransparent or opaque to the external stimulus. Alternatively, the whole portion of the packaging may be transparent to the external stimulus. By employing the modified packaging, the optical article may be authorized at the point of authorization, such as a point-of-sale, or an issuance counter of a store. This way the authorization process may be performed while maintaining the optical article in the packaging, thereby making the authorization process more efficient and time saving.

Referring now to FIG. 1, the optical storage medium 10 includes a data storage region 12 and an inner hub 14. The data storage region 12 includes an optical data layer 20 (FIG. 2), which stores the data, whereas the inner hub 14 is the non-data storage region of the optical storage medium 10. The optical storage medium 10 has a convertible element disposed on the data storage region 12 in the form of a film 16 in the pre-activated state of the optical storage medium 10. The film 16 includes a convertible material, such as a bleachable dye. The convertible material may interact with an external stimulus, such as radiation of a predetermined wavelength range. The optical storage medium 10 upon interaction with the external stimulus undergoes an optical state change, whereby a property or characteristic of the convertible material is altered, thereby changing the state of functionality of the optical storage medium 10. For example, in the pre-activated state of the optical storage medium 10, the convertible material of the film 16 may be opaque to the incident laser that is used to read the optical storage medium 10. That is, in the pre-activated state the convertible material may inhibit the incident laser from reaching the optical data layer 20, whereas after interacting with the external stimulus the convertible material may become transparent to the wavelength of the incident laser. As noted above, this change in the optical state may be caused by chemical changes within the convertible material, which are caused by exposure to the external stimulus. The film 16 may cover at least a portion of the optical storage medium 16. In the pre-activated state, the optical storage medium 16 may be unplayable or unreadable at least in the portions where the film 16 is disposed. In other words, the optical storage medium 16 has a reflectivity of less than about 45 percent, or preferably less than about 20 percent, or more preferably less than 10 percent in the portions where the film 16 is disposed.

Figure 2:
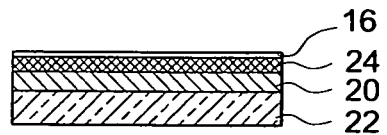
FIG. 2 is a cross-sectional side view of the optical storage medium of FIG. 1 taken along line II-II.

FIG. 2 illustrates a cross-sectional side view of the optical storage medium 10 of FIG. 1. In a simplified illustration of the optical storage medium 10, the optical storage medium 10 includes an optical data layer 20 disposed on a substrate 22. The substrate 22 may include a polycarbonate material. The substrate 22 may include a convertible material, such as the convertible material of the film 16. The optical data layer 20 is protected by employing a capping layer 24. It should be appreciated that the capping layer 24 is transparent to the wavelength of the incident laser, which is used to read the data stored in the optical article 10. The capping layer 24 may prevent the optical data layer from exposure to environmental elements, such as air, oxygen, moisture, which may react with the optical data layer and cause any undesired changes, such as oxidation of the optical data layer. Also, the capping layer 24 may prevent mechanical damages to the surface of the optical data layer 20. For example, the capping layer may be scratch resistant. Further, the optical storage medium 10 includes the film 16 of the convertible material, which is disposed on the capping layer 24.

Figure 3:
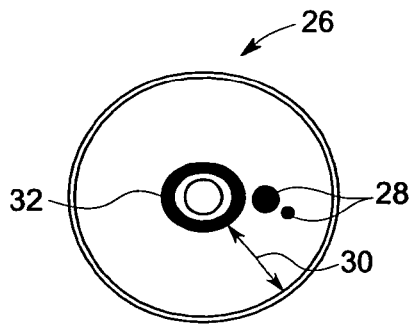
FIG. 3 is a schematic view of an optical storage medium having a convertible material disposed in a discrete area in accordance with an exemplary embodiment of the invention.

FIG. 3 illustrates an optical storage medium 26 having a convertible material disposed thereon in discrete portions 28 in the pre-activated state of the optical storage medium 26. The portions 28 are disposed in the data storage region 30 surrounding the inner hub 32. The optical storage medium 26 may have an optical reflectivity of less than 45 percent in these portions 28. Therefore, the optical storage medium 26 may not be readable in these portions 28. In some embodiments, fewer than all of the discrete portions 28 may include convertible material. In these embodiments, the portions having the convertible material are made to interact with the external stimulus to change the state of functionality of the optical storage medium 26.

Figure 4:
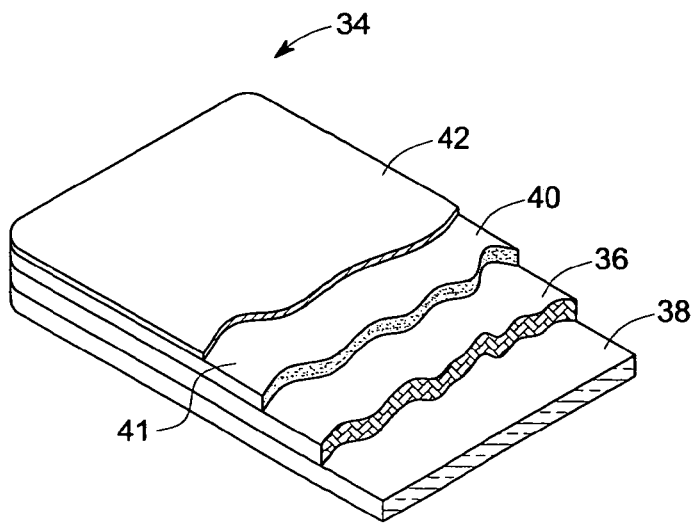
FIG. 4 is a partial perspective view of an identification card having a convertible material disposed on an optical layer in accordance with an exemplary embodiment of the invention.

Turning now to FIG. 4, a simplified structure of an optical article, such as an identification (ID) card 34 is illustrated. As with the optical storage media 10 and 26, the ID card 34 includes an optical data layer 36 for storing data. The ID card 34 further includes a substrate 38 on which the optical data layer 36 is disposed. The substrate 38 may include a polycarbonate material. In an exemplary embodiment, the substrate 38 may include the convertible material that may change an optical property upon interaction with the external stimulus, thereby changing the state of functionality of the card 34. The optical data layer 36 is protected by a capping layer 40. As with the substrate 38, the capping layer 40 may also include a polycarbonate material. As noted above with regard to the capping layer 24, the capping layer 40 may be used to protect the optical data layer 36 from chemical and/or mechanical damages. The ID card 34 includes a convertible material disposed on the surface 41 of the capping layer 40 in the form of a film 42. In the pre-activated state, the film 42 may prohibit the incident laser from reaching to the optical data layer 36 and reading the data stored therein. However, after interaction with the external stimulus, the film 42 may allow an incident laser to pass through and reach the optical data layer 36, thereby allowing the reader to read the data stored in the optical data layer 36 of the card 34. The ID card 34 may be exposed to the external stimulus before issuing the ID card 34 to the concerned authority, thereby rendering the data in the optical data layer 36 readable by the incident laser. By protecting the data in this manner before issuance of the ID card 34 to the concerned authority, the undesirable use of the card may be prevented in the event the card is stolen from the store where the card was stored prior to issuance. The film 42 may be disposed in different forms on the surface of the capping layer 40. For example, the film 42 may extend across a portion of the capping layer 40, or may form a patterned layer extending across a portion of the capping layer 40, or may form a continuous film, such as film 42, on the capping layer 40.

As described with regard to FIGS. 1-4, the convertible element renders the optical article completely or partially unreadable in the pre-activated state of the functionality by changing the reflectivity of the optical article at certain locations. In the activated state of functionality of the optical article, the properties of the convertible element are changed from those in the pre-activated state by interacting the optical article with the external stimulus, as will be described below. Therefore, the optical article is ineffective in the pre-activated state.

Figure 5:
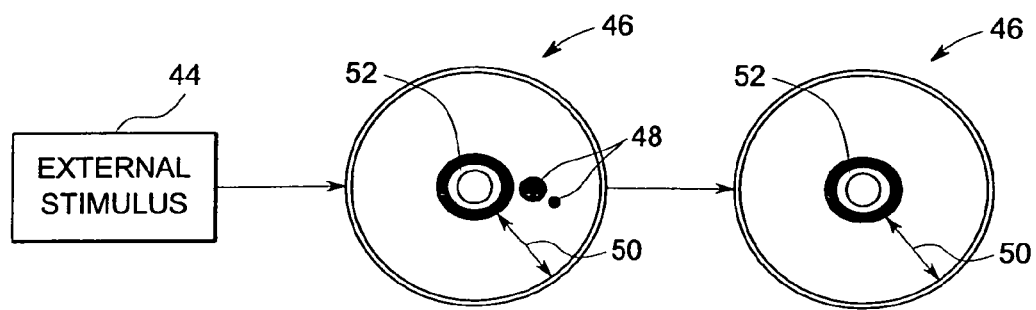
FIG. 5 is a diagrammatical representation of a method for changing a functionality of an optical storage medium in accordance with an exemplary embodiment of the invention.

FIG. 5 illustrates a method of changing the state of functionality of an optical article, such as an optical storage medium 46. Although the illustrated embodiment of FIG. 5 is represented with regard to the optical storage medium 46, the method may be employed to change the functionality of other optical articles, such as an ID card, a payment card, a personal information card, and the like. As illustrated, the external stimulus 44 interacts with the convertible element disposed in discrete portions 48 of the optical storage medium 46. The external stimulus 44 may be, for example, a laser, infrared radiation, a thermal energy, infrared rays, X-rays, gamma rays, microwaves, visible light, ultra violet light, ultrasound waves, radio frequency waves, microwaves, electrical energy, chemical energy, magnetic energy, mechanical energy, or combinations thereof. The optical storage medium 46 includes a data storage region 50 and an inner hub 52.

The optical properties of the convertible material are altered upon interaction with the external stimulus 44, thereby increasing the optical reflectivity of the optical article for the incident laser in the portions 48, to make the optical storage medium 46 transparent to the incident laser the portions 48. In some embodiments, the external stimulus 44 may be generated by an excitation source (not shown) that may generate radiation in a predetermined wavelength range.

Figure 6:
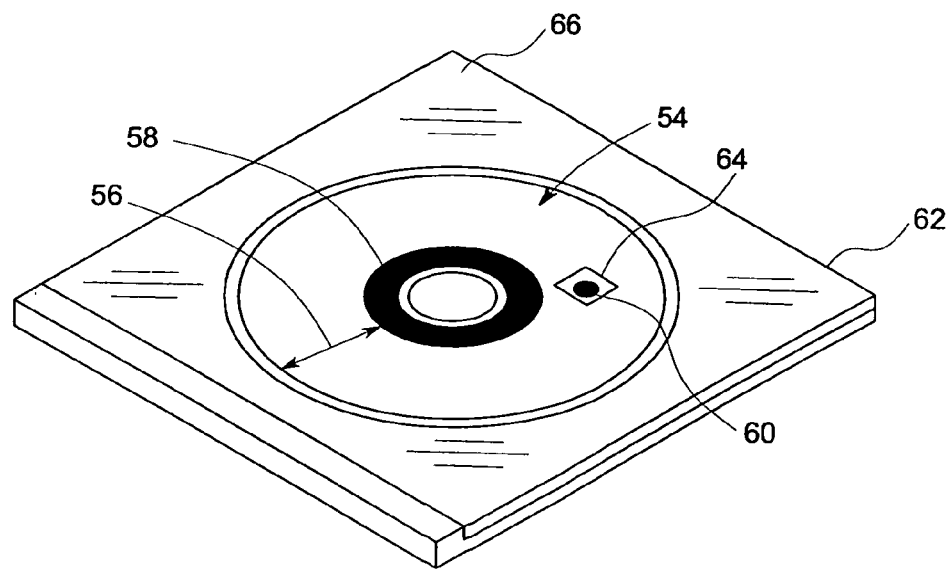
FIG. 6 is a perspective view of an optical storage medium disposed inside a packaging in accordance with an exemplary embodiment of the invention.

FIG. 6 illustrates an optical article, such as an optical storage medium 54, having a data storage region 56 and an inner hub 58. The optical storage medium 54 includes a convertible material disposed in discrete portions 60 on the optical storage medium 54. The optical storage medium 54 is stored inside a packaging 62. The packaging 62 may direct an external stimulus towards the portion 60 through a window 64 that is aligned with at least a portion of the convertible material. In the illustrated embodiment, the rest of the area 66 of the packaging 62, other than the window 64, may not be transparent to the external stimulus, and therefore may not participate in directing the external stimulus 44 from outside the packaging 62 toward the portions 60.

Figure 7:
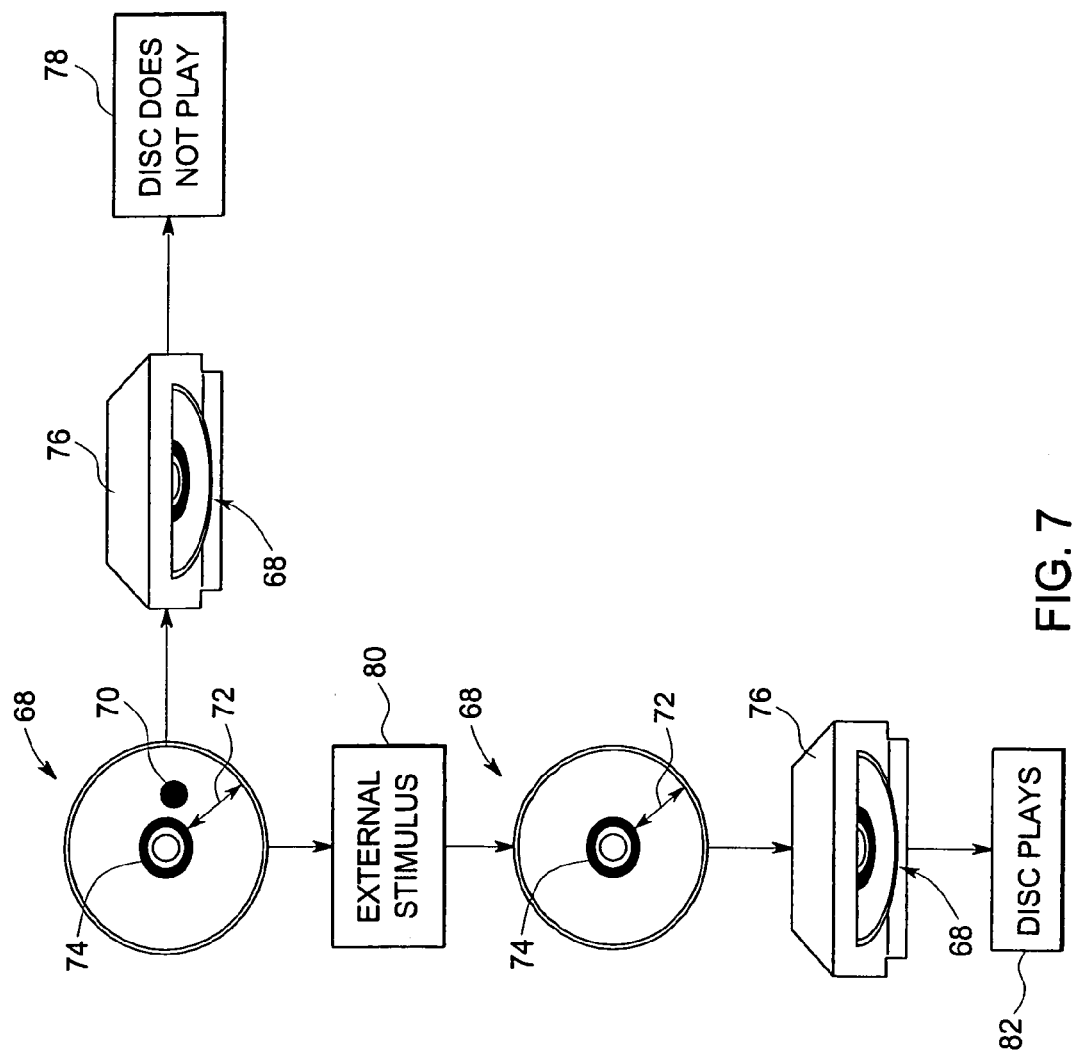
FIG. 7 is a diagrammatical representation of a method for changing a functionality of an optical storage medium in accordance with an exemplary embodiment of the invention.

FIG. 7 illustrates a method of changing a functionality of an optical article, such as optical storage medium 68. The method may be applied for other optical articles, such as an ID card, a payment card, a personal information card, and the like. As illustrated, the optical storage medium 68 includes a data storage region 72 having a convertible element disposed in discrete portions 70. The optical storage medium 68 also has an inner hub 74. When inserted in an optical reader 76 prior to directing an external stimulus on it (pre-activated state), the optical storage medium 68 does not play, that is, the data in the optical data layer (not shown) of the optical storage medium 68 is unreadable (block 78). However, when interacted with an external stimulus 80, the convertible element alters the functionality of the optical storage medium 68 (activated state) as described above and renders it readable by the reader 76 (block 82).

Figure 8:
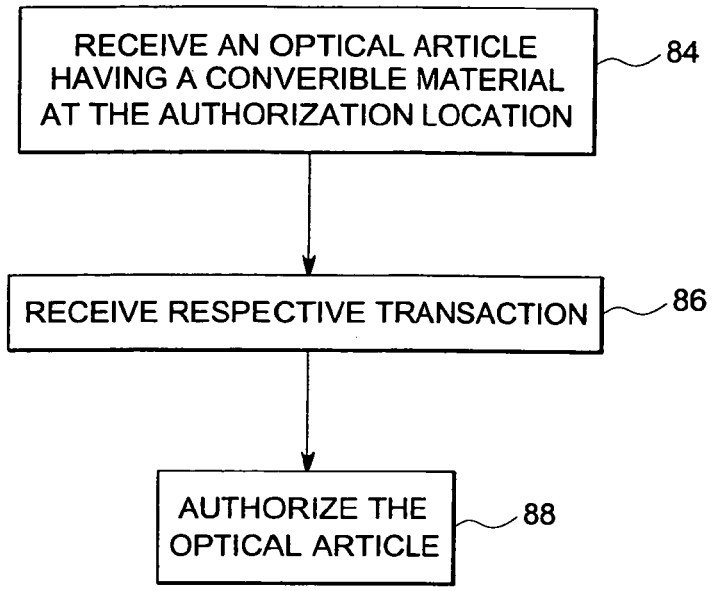
FIG. 8 is a flow chart illustrating a business method for the sale of an optical storage medium in accordance with an exemplary embodiment of the invention.

FIG. 8 illustrates a method of transaction of an optical article having a convertible material. At block 84, an optical article having a convertible element is received for transaction. The transaction may be carried out at a location, such as a point-of-sale of a shop from where the optical article is being purchased, or a storage location in a working place, where the authorization of the optical article is necessitated prior to being issued to the user. It should be noted that for simplicity throughout the application the term "point-of-sale" is used to represent any location where the authorization of the optical article takes place to make it available to the user, such as a customer. At block 86, the transaction for the optical article is received. The transaction may either include a monetary transaction or verification of the user receiving the optical article. For example, at a point-of-sale of a shop, the transaction may include a monetary transaction, whereas in an office premises the transaction may include verification of the user receiving the optical article.

At block 88, the optical article is authorized for use, that is, the state of functionality of the optical article is changed from a pre-activated state to the activated state at a location, such as point-of-sale. Accordingly, if the optical article is taken without a proper transaction being conducted, the optical article will either not be readable or may be readable only for a definite period of time. For example, the definite period of time of an optical article which is not activated may range from about 8 hours to about 72 hours, which is much less than the typical life of the optical article. The authorization of the optical article may be done in several ways at the authorization location. For example, the optical article may be authorized by exposing the optical article to a light source having a predetermined power and emitting a light of predetermined wavelength range by placing the optical article with or without the packaging in a container having the light source. In this embodiment, the packaging may have a window as described in FIG. 6 and the light may be directed to at least a portion of the convertible element through the window.

Additionally, in case of fewer than all of the discrete portions of the optical article having the convertible element, the discrete portions not having the convertible element may be made such that if interacted with the external stimulus they will render the optical article at least partially unreadable. In these embodiments, only the seller will be aware of the location of the discrete portions having the convertible element, which needs to be interacted with the external stimulus to render the optical article playable.

The discrete portions that may render the optical article at least partially unreadable upon interaction with the external stimulus may be referred to as control block sectors. However, the control block sectors may also render the optical article readable upon interaction with the external stimulus. The size of the control block sectors may be a few millimeters on an optical article, such as an optical storage medium. In embodiments where the control block sectors render the article unreadable after interaction with the external stimulus, when the incident laser employed to read the optical article comes across these control block sectors, the control block sectors may lead the incident laser to points in the data layer which may not permit the optical article to be read by the incident laser. This may be accomplished by creating errors, such as a tailored menu. For example, the menu logic of a tailored menu may be altered based on whether those control block sectors are readable. Accordingly, the tailored menu may be authored such that the optical article may boot to a menu which allows complete reading of the entire data set on the optical article if the control block is readable. Alternatively, when the control block sectors render the optical article readable after interaction with the external stimulus, the optical article may be authored to boot to an alternate menu that disallows reading of the contents if the control block is unreadable. In another embodiment, the tailored menu may be authored such that when the incident laser comes across the control block having the tailored menu, the reader or the player will display a message indicating to the user that the optical article is not authorized. In the pre-activated state, the optical article is authored in a way such that when the control block is readable, it directs the reader to a menu that does not enable reading of the optical article. Whereas, during the activated state, the activation process destroys (creates errors) at the control block such that when the activated optical article is read, the control block is unreadable and the reader is directed to a menu that allows reading of the optical article.

In embodiments where the optical article includes a control block sector, a metallic foil, such as aluminum layer, may be disposed on the optical article. Depending on the position of the foil layer, the reflectivity of the incident laser may be affected in the presence of the foil layer. The foil layer is disposed such that it covers the surface of the optical article leaving the portion having the control block sectors uncovered. Accordingly, when the optical article is subjected to external stimulus, such as RF radiation, the control block sectors may be destroyed while the foil layer protects the portions covered thereby. Subsequently, the foil layer may be removed by applying a magnetic field to lock the foil layer in a desirable position where it would not obstruct the path of the incident laser used to read the optical article, and the optical article may be read by the incident laser. Portions of the optical article that were destroyed by the external stimulus will not be readable by the incident laser.

A tailored menu may be located in the optical data layer of the optical article. It should be appreciated that in an optical storage medium, the incident laser first reads the data of the files located near the center and subsequently reads the data toward the outer rim, until a valid optical signal is returned to the reader. This optical signal allows track-following-servos to lock on to the data layer, and then the digital decoder begins reading the data. Accordingly, the incident laser may first read the data stored in the areas/files located close to the inner hub of the optical storage medium. These files may contain a menu, such as a startup menu that may facilitate the player/reader to skip to certain sections of the optical storage medium. In some embodiments, the player reads these files and displays the menu on a screen for the viewer to choose from.

In one embodiment, the first valid or readable file that the player may encounter when scanning from the inner hub outward is the tailored menu. This tailored menu may be such that, the tailored menu may disallow the incident laser to scan further, or may not allow the user to go anywhere except back to the start up menu. In such embodiments, the displayed message may be, for example, "This optical storage medium has not been authorized". Additionally, the optical storage medium may also include a second menu, or a valid menu, which is the menu that upon interaction with the incident laser may render the optical storage medium readable. That is, if the incident laser encounters this menu, then the optical storage medium will play normally. In the activated state, the first file that the incident laser may find is the normal menu file, and the optical storage medium plays normally. Whereas, if the disk has not been activated, the tailored menu is encountered by the incident laser, and the optical storage medium may not play.

In certain embodiments, the optical storage medium may include a tailored menu in combination with one or more convertible elements, such as a dye, an RF circuitry, or an electro-chromic structure. The tailored menu may be in operative association with one or more convertible elements, such that when the optical article is exposed to an external stimulus, the convertible elements may react with the external stimulus and make the tailored menu unreadable for the incident laser. That is, as a result of interaction of the convertible element with an external stimulus, the convertible element may render that particular portion of the optical data layer having the tailored menu unreadable.

For example, when the tailored menu is employed in combination with a radiation sensitive convertible material, for example, an RF or microwave sensitive convertible material, the optical data layer beneath the portion of the optical article having the tailored menu may be coated with the radiation sensitive convertible material. As a result of interaction with the radiation, the radiation sensitive convertible material may become opaque to the incident laser, thereby preventing the tailored menu from being read by the incident laser. Hence, the optical article may be rendered readable.

When used in combination with an RF circuitry, RF or microwave radiation may be used to activate the optical storage medium. In an exemplary embodiment, the RF circuitry may include an RFID tag. The RFID tag upon reaction with external stimulus, such as the RF or microwave radiation, may produce thermal or electrical energy, which may then react with a convertible element disposed on a portion of the optical data layer having the tailored menu and render the optical data layer in that particular portion opaque to the incident laser. Alternatively, the optical storage medium may employ an electro-chromic structure and the tailored menu in combination with two resonant circuits, one with a high Q value and one with a low Q value, both resonant at about the same frequency. The two resonant circuits may be employed in the inner hub of the optical storage medium. The two resonant circuits may be inductively coupled to an external radiation source, such as an RF or microwave radiation source. A radiation of the proper frequency and field strength may create an electrical signal in the high Q circuit and not the low Q circuit. The electrical signals from the two coils may interact with the electro-chromic structure to render it opaque to the incident laser. If the field strength is too high, then both circuits will not generate electrical signals that modify the electro-chromic layer. If the field strength is too low, then both circuits will not generate electrical signals that modify the electro-chromic layer. If the frequency is not at resonance, then both circuits will not generate electrical signals that modify the electro-chromic layer.

When used in combination with an electro-chromic structure, the electro-chromic structure may be in operative association with a converter, and may be disposed within the structure of the optical storage medium. The converter may convert RF or microwave radiation into electrical signal. Further, a conductive material may be disposed on the entire or a partial surface of the optical storage medium while leaving the portions of the data storage region where the underneath optical data layer employs the tailored menu. The optical storage medium may then be interacted with an external radiation, such as RF or microwave radiation, which may make the portion of the optical data layer having the tailored menu, opaque to the incident laser. Alongside, the external radiation may interact with the converter to produce electrical signals, which may then interact with the electro-chromic structure to render the optical article readable in the activated state.

Alternatively, for the optical articles employing tailored menus, the electro-chromic structure may be coupled to, and in operative association with, the portion of the optical data layer having the tailored menu. In these embodiments, the electro-chromic structure may be converted into an opaque structure upon interaction with an external radiation at the time of authorization, thereby making the optical article readable. The electro-chromic structure may convert into a transparent structure, if interacted with radiation other than the one used for authorizing the optical article. This way, an un-authorized user may not be able to guess and authorize the optical article.

The convertible material in the optical article may contain a dye layer with a saturable absorber or a threshold material that is bleachable with an incident laser. It should be appreciated that a threshold material may be bleached by an incident laser having a power over a certain threshold value. Since there is ample radiation (UV, visible radiation or heat) in sun light, an un-authorized user, such as a shoplifter, may use the radiation from the sun light to activate the optical article. Therefore, the dye having a nonlinear threshold character may have a tailor-made incident radiation power to render the optical article readable. For example, the convertible material may be such that when the radiation power is lower than the threshold, nothing happens. Thus, the threshold character not only blocks the shoplifter, but also makes the optical article immune to the day light radiation in the shop or shipment. On the contrary, if the radiation is too high, the optical article absorbs too much energy and is rendered un-readable. However, a predetermined window of radiation power activates the optical article and renders it readable. For example, metallophthalocyanine (MPC) or fullerene (C60) is added to the photo or thermal bleachable dye. MPC and C60 are each a reverse saturate absorber material (RSA) which absorbs energy only when the radiation having the wavelength 532 nm reaches a certain predetermined power. It should be appreciated that the material of the substrate of the optical article, such as polycarbonate, is usually a poor heat conductor. Hence, when the polycarbonate strongly absorbs radiation, it increases the local temperature, where thermal bleachable dye locates. If the incident power is too high, the optical article may be damaged. The threshold is controlled by the concentration of the dye.

The source for external stimulus may be inbuilt in the bar code reader, a radio frequency identification reader, an electronic surveillance article reader, like an acousto-magnetic tag detector or de-activator, such that when the optical article or the packaging having the optical article is swiped through the bar code reader, the convertible element is allowed to interact with the external stimulus and the state of the optical article is converted to the activated state. Further, the source of the external stimulus may also be integrated with a hand-held wand or computer controlled light boxes at the aisles. It is desirable to have light sources that have a power and/or wavelength of the light which is not commonly available, specifically to defaulting users, such as shoplifters or thieves.

Additionally, the verification of the activation may be conducted on the optical article. The verification may be desirable either to: 1) identify the defaulting users, or 2) to confirm that the optical article was accurately activated at the first point of interaction, such as a point-of-sale. In some embodiments the verification may be conducted at the second location, such as the exit point of the storage location in office premises, a shop, or a store, that is to say, the activation of the optical article may be conducted just before the user leaves the premises of the shop or mall. In these embodiments, the security system installed at the exit locations may send out signals indicating whether or not the optical article is activated. Further, a device may be installed in the security system, such that the device may interact with the convertible element in the optical article and make it permanently unreadable if the optical article was carried out without being activated.

As will be described in detail below, the material of the convertible element may be in operative association with one or more devices, such that the devices may receive energy from the external stimulus in one form and convert it into another form. The converted form of energy is then utilized by the convertible material to change the state of functionality of the optical article. For example, the convertible material may be in operative association with radio frequency (RF) circuitry, which may react with an external stimulus, such as radio frequency waves, or microwaves, and convert it into thermal energy. This thermal energy may then be utilized by the convertible material to change the functionality of the optical article from the pre-activated state to the activated state, as will be described in detail below with regard to FIGS. 9-13.

Figures 9, 10:
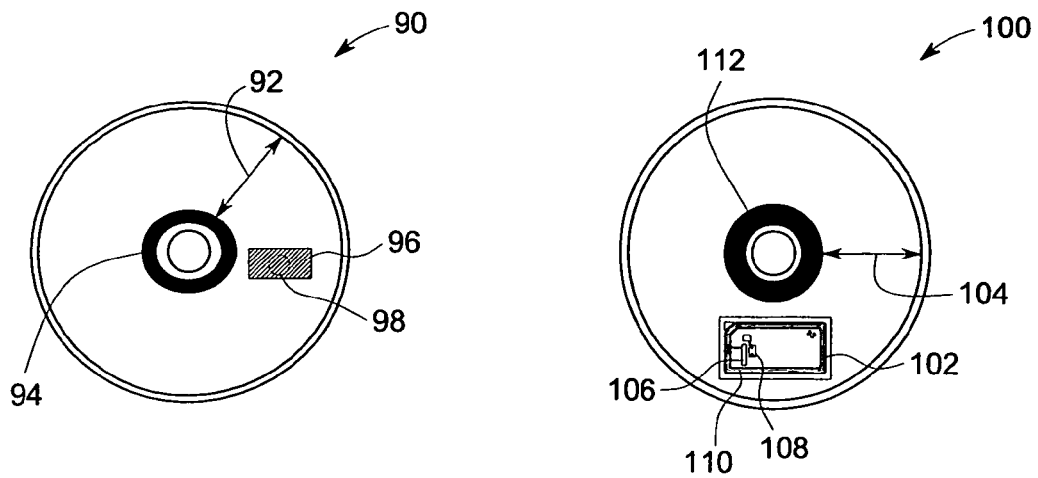
FIG. 9 is a schematic view of an optical storage medium having radio frequency circuitry disposed thereon in accordance with an exemplary embodiment of the invention.
FIG. 10 is a schematic view of an optical storage medium having radio frequency circuitry disposed thereon in accordance with an exemplary embodiment of the invention.

FIG. 9 illustrates an optical article, such as an optical storage medium 90. The optical storage medium 90 includes a data storage region 92 and a non-data storage region or inner hub 94. The optical storage medium 90 may being transformed from a pre-activated state to an activated state of functionality. The RF circuitry 96 may interact with RF radiation to generate thermal energy. As illustrated, the RF circuitry 96 may be located either on the data storage part 92 as shown or in the inner hub 94 of the optical storage medium 90. The optical storage medium 90 includes a convertible material 98 coupled to and in operative association with the RF circuitry 96. The convertible material 98 may be in the form of a layer. The layer may be continuous or patterned, or may be disposed in a discrete portion of the optical article. Further, the convertible material 98 may include a material that is responsive to the thermal energy produced by the RF circuitry 96. The convertible material 98 may include a bleachable dye, a photovoltaic material, a magnetic material, an electro-chromic material, thermo-chromic material, or combinations thereof. In certain embodiments, the convertible material 98 may include compounds of merocyanine, stryl, oxonol, or combinations thereof. Alternatively, the convertible material 98 may be an adhesive, such as a temperature or UV-sensitive adhesive. Preferably the bond strength of this adhesive will decrease upon exposure to external stimulus, such as magnetic radiation, RF radiation, microwave radiation, thermal energy or UV light. Examples include adhesives commonly used for semiconductor wafer dicing tape or an oxirane ring-bearing component blended or reacted with to achieve an adhesive. The adhesive may also include an effective amount of ionic photo-initiator capable of promoting the polymerization of oxirane rings. In such embodiments, the adhesive may couple the RF circuitry 96 to the surface of the optical storage medium 90 in the pre-activated state. Whereas, after reaction with the thermal energy generated by the RF circuitry 96 as a result of the RF circuitry 96 being exposed to the RF radiation, the bond strength of the adhesive may lessen, thereby facilitating the removal of the RF circuitry 96 from the surface of the optical storage medium 90 in the activated state.

In some embodiments, the RF circuitry 96 may include different mechanisms for converting the RF radiation into thermal energy. For example, the RF circuitry 96 may include one or more micro-heaters, heater chips, capacitors, or coils. Further, the RF circuitry 96 may include a programmable logic chip, such as in a radio frequency identification (RFID) tag, as will be described with regard to FIG. 10. Upon exposure to the appropriate RF radiation, the RF circuitry 96 employing, for example, a heater chip, is energized and converts the RF radiation into thermal energy. This conversion of RF energy into thermal energy creates a temperature spike of about 50° C. to 200° C. and locally heats the area of the RF circuitry 96. The convertible material disposed proximate to and coupled to the RF circuitry 96 interacts with this thermal energy, thereby changing an optical property. For example, due to the temperature spike, the dye layer on the optical article 90 may be bleached to become transparent to the incident laser. In some embodiments, the monomers in the adhesive, upon interaction with the thermal energy generated by the RF circuitry 96 are cured, resulting in decreased adhesion between the RF circuitry 96 and the optical storage medium 90. Decreased adhesion facilitates removal of the RF circuitry 96 by peeling it off the optical storage medium 90 when the user is ready to use the optical storage medium 90.

As illustrated in FIG. 10, an optical storage medium 100 includes a radio frequency identification (RFID) tag 102 disposed on the data storage region 104 of the optical storage medium 100. The RFID tag 102 in its basic form includes an integrated circuit (IC) operatively coupled to an antenna 110, which is a small coil of wires. The data is stored in the IC, sent to the antenna 110, and transmitted to a reader. The RFID tag 102 also includes a program logic chip 108 and a capacitor 106. In some embodiments, the antenna 110 may be disposed in the inner hub 112 of the optical storage medium 100. The optical storage medium 100 includes a layer (not shown) of a convertible material that is disposed between the RFID tag 102 and the optical storage medium 100. The layer of the convertible element may render an optical state change when subjected to thermal energy produced by the RFID tag 102, thus altering the state of functionality of the optical storage medium 100.

As with FIG. 6, the optical articles 90 or 100 may also be placed in a packaging, such as packaging 62, such that the packaging may direct the RF radiation to at least a portion of the RF circuitry.

Figure 11:
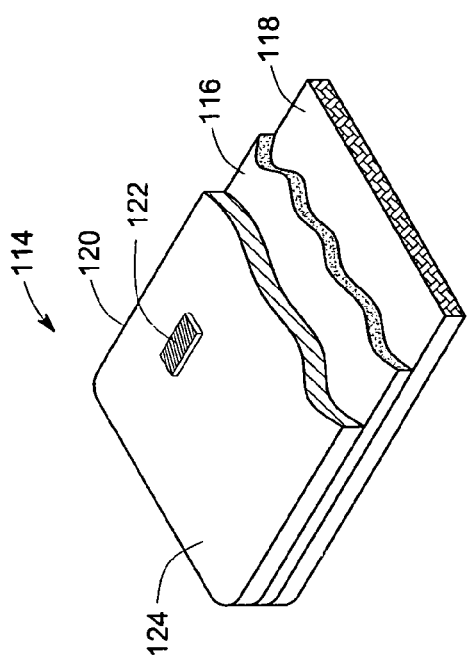
FIG. 11 is a partial perspective view of an identification card having a convertible material disposed on an optical layer in accordance with an exemplary embodiment of the invention.

FIG. 11 is a cut away perspective view of an optical article, such as an ID card 114, having an optical data layer 116 disposed on a substrate 118. The ID card 114 also includes a capping layer 120. As with capping layer 40 (FIG. 4), the capping layer 120 may chemically and mechanically protect the optical data layer 116. RF circuitry 122 is disposed on and coupled to a surface 124 of the capping layer 120 as illustrated. The RF circuitry 122 is coupled to the capping layer 120 by employing a convertible material (not shown), such as, for example, a thermally-reactive adhesive, which is responsive to the thermal energy produced by the RF circuitry 122 upon interaction with RF radiation. The bond strength of the adhesive reduces upon interaction with the thermal energy. Accordingly, during authorization, when the RF circuitry 122 interacts with the RF radiation, the adhesive loses its bond strength, thereby facilitating the removal of the RF circuitry from the capping layer 120 and making the ID card 114 readable in the activated state. Alternatively, the convertible material may include a thermally responsive bleachable dye, such as a thermo-chromic dye, that changes color upon interaction with the thermal energy. In the pre-activated state of the ID card 114, the dye may inhibit the incident laser from reaching the optical data layer 116 by either reflecting or absorbing the incident laser. Whereas in the activated state the dye may become transparent to the incident laser, thereby enabling the incident laser to reach the optical data layer 116 and read the data stored in the optical data layer 116.

Figure 12:
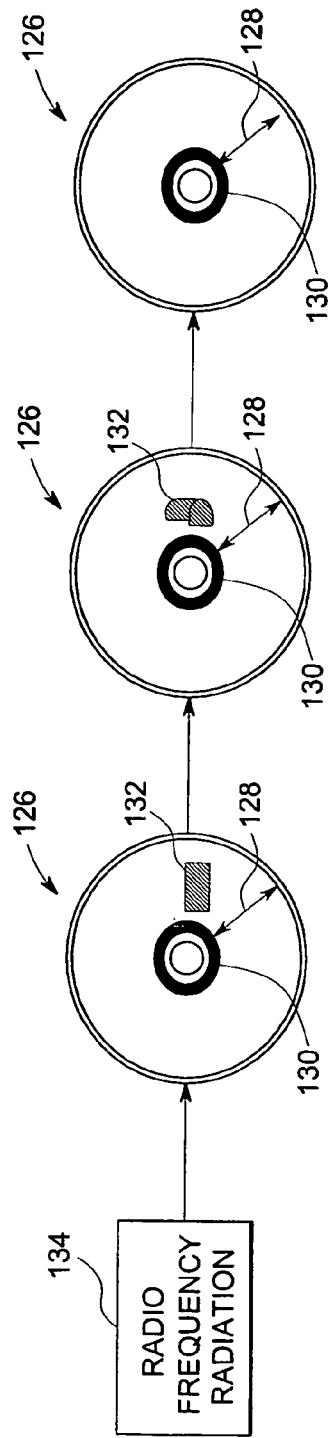
FIG. 12 is a diagrammatical representation of a method for changing a functionality of an optical storage medium in accordance with an exemplary embodiment of the invention.

With reference to FIG. 12, a method of changing a functionality of the optical article, such as optical storage medium 126, is illustrated. Although the illustrated method is with regard to optical storage medium 126, it should be appreciated that this method may be employed to change the functionality of other optical articles, such as an ID card, a payment card, a personal information card, etc., during authorization. The optical storage medium 126 includes a data storage region 128 and a non-data storage region or inner hub 130. The optical storage medium 126 further includes RF circuitry 132 disposed on and coupled to the optical storage medium 126. The optical storage medium 126 may include a convertible material (not shown), such as a bleachable dye or an adhesive disposed between the RF circuitry 132 and the optical storage medium 126. The convertible material may alter the state of functionality of the optical storage medium 126 as described above with regard to FIGS. 9-11. The method includes employing RF radiation 134 to interact with the RF circuitry 132. During authorization, the RF circuitry 132 produces thermal energy by interacting with the RF radiation 134. This thermal energy then reacts with the convertible material and alters an optical property of the convertible material to provide a readable optical storage medium 126. Following authorization, the RF circuitry 132 is rendered into a detachable form of RF circuitry 132'. The detachable form of RF circuitry 132' may be detached either just after authorization, or may be detached later by the user prior to employing the optical storage medium in a device, such as a player.

Figure 13:
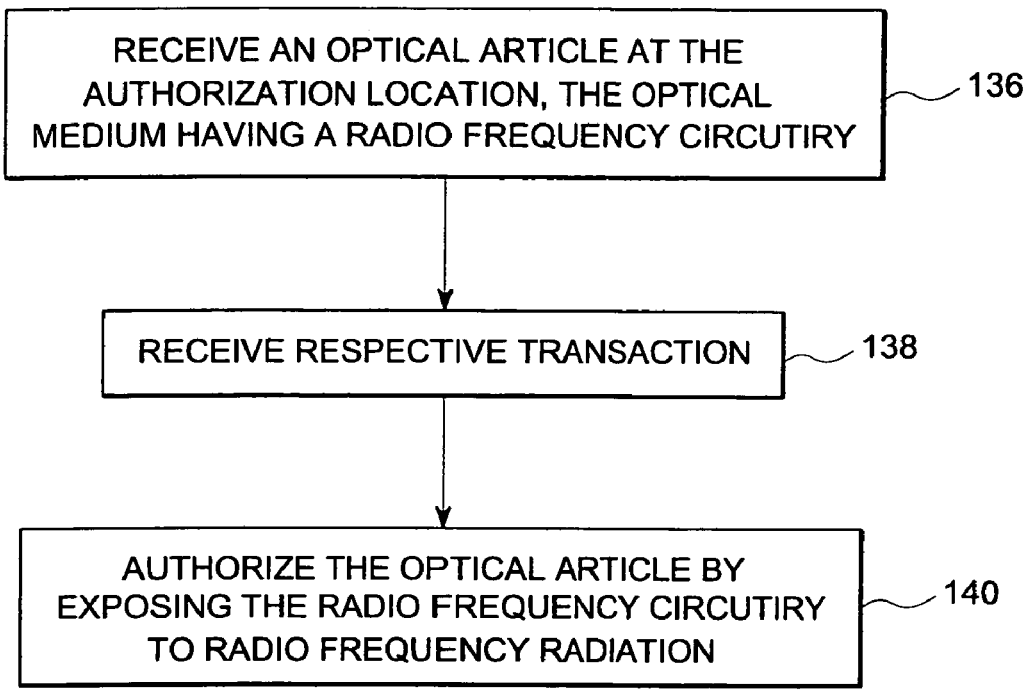
FIG. 13 is a flow chart illustrating a business method for the sale of an optical storage medium in accordance with an exemplary embodiment of the invention.

As with FIG. 8, FIG. 13 illustrates a method of transaction of an optical article having a RF circuitry. At block 136, the optical article, such as optical articles 90, 100, 114 or 126, is received at the authorization location. At block 138, a respective transaction for the optical article is received. As noted above with regard to FIG. 8, the transaction may include a monetary transaction in case of a purchase of the optical article, or the transaction may include identification of the person receiving the optical article after authorization. Further, at block 140 the optical article is authorized as described above with reference to FIGS. 9-11.

Additionally, verification of the authorization may be conducted on the optical article. In such embodiments, the security system installed at the exit locations or at point of sale may send out signals indicating whether or not the optical article is activated. Further, a device may be installed in the security system, such that the device may interact with the convertible element in the optical article and make it permanently unreadable, if the optical article is carried through the security system without being activated. For example, the device may interact with the adhesive and make it securely bond the RF circuitry to the optical article.

In alternate embodiments to dyes and RF circuitry, the optical article may include a convertible element that is responsive to electrical stimulus. The convertible element may bring about a change in at least one of its optical properties upon interaction with an electrical stimulus, such as voltage or current, thereby changing the state of functionality of the optical article from a pre-activated state to an activated state. The convertible element may be disposed either on the surface of the optical article, or inside the structure of the optical article, as will be discussed below.

Figure 14:
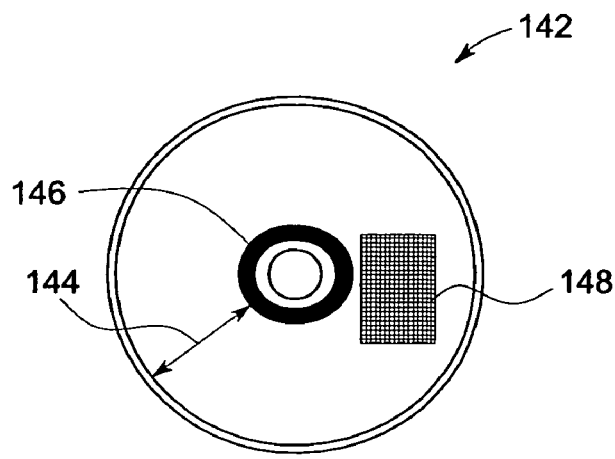
FIG. 14 is a schematic view of an optical storage medium having an electro-chromic structure disposed thereon in accordance with an exemplary embodiment of the invention.

FIG. 14 illustrates an optical storage medium 142 having a data storage region 144 and a non-data storage region or inner hub 146. The optical storage medium 142 includes an electro-chromic structure 148 disposed in the data storage region. The electro-chromic structure 148 includes a cell structure, having an electrolyte disposed between electrodes, such as cathode and an anode. When the electrical stimulus is provided to the electrodes, the transfer of charges takes place between the electrodes via the electrolytes, thereby causing the optical property of the electro-chromic structure 148. The electro-chromic structure may be disposed in a discrete area of the optical article, a continuous layer extending across a portion of the optical article, or a patterned layer extending across a portion of the optical article.

Figure 15:
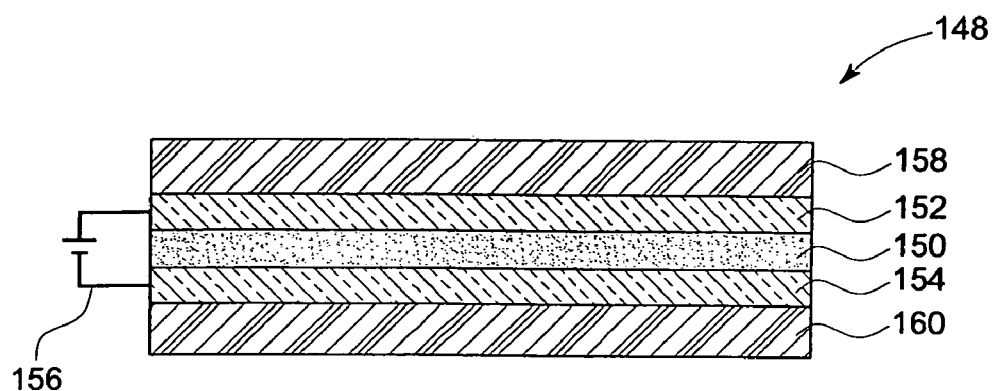
FIG. 15 is a cross-sectional side view of the electro-chromic structure of the optical storage medium of FIG. 14 in accordance with an exemplary embodiment of the invention.

FIG. 15 illustrates an enlarged cross-sectional side view of the electro-chromic structure 148. The electro-chromic structure 148 includes an electrolyte layer 150 interposed between two layers 152 and 154 of an electro-chromic material. The electrolyte may be a polymer electrolyte, such as polyacrylic acid lithium salt. In some embodiments, polymer electrolytes are composites of polyethylene oxide and a salt, such as LiClO4, $LiAsF_6$, or $LiCF_3SO_3$. The electro-chromic layers 152 and 154 act as anode and cathode and transfer charge to the electrolyte in presence of applied electrical stimulus using electrical connections 156. The electrolyte responds to the applied charge by transferring ions into the respective layers 152 and 154. When ions are transferred into layer 152 or 154, the layer is said to be in a doped state. In the doped state, new energy levels are filled or become vacant. The change in the state of these energy levels gives rise to changes in the optical absorption bands of the materials of layer 152 and 154. The electro-chromic layers 152 and 154 may inhibit an incident laser from reading data in the optical data layer of the optical article 148. In the pre-activated state of the optical article, the electro-chromic layers 152 and 154 may either block the incident laser from reflecting back to the reader where it is read, or may absorb the incident laser to prevent the incident laser from reaching the optical data layer. After interaction with the electrical stimulus the electro-chromic layers 152 and 154 may become transparent to the incident laser, thereby permitting the data in the optical data layer to be read by the incident laser.

The two electro-chromic layers 152 and 154 may or may not have similar material compositions. The electro-chromic materials may include poly(3,4-alkylenedioxythiophene) or poly(3,4-alkylenedioxypyrrole) based polymeric materials. For example, the electro-chromic material may include poly (3,4-ethylenedioxythiophene). Alternatively, the electro-chromic layers 152 and 154 may include inorganic materials. In an exemplary embodiment, the optical article 148 includes an electro-chromic structure having electro-chromic layers formed by sputtering tungsten oxide on the surface of the optical article. In some embodiments, the electro-chromic layers 152 and 154 may be a combination of two or more layers. Additionally, substrates 158 and 160 are coupled to the two electro-chromic layers 152 and 154 and disposed on the sides opposite the ones in contact with the electrolyte 150.

Figure 16:
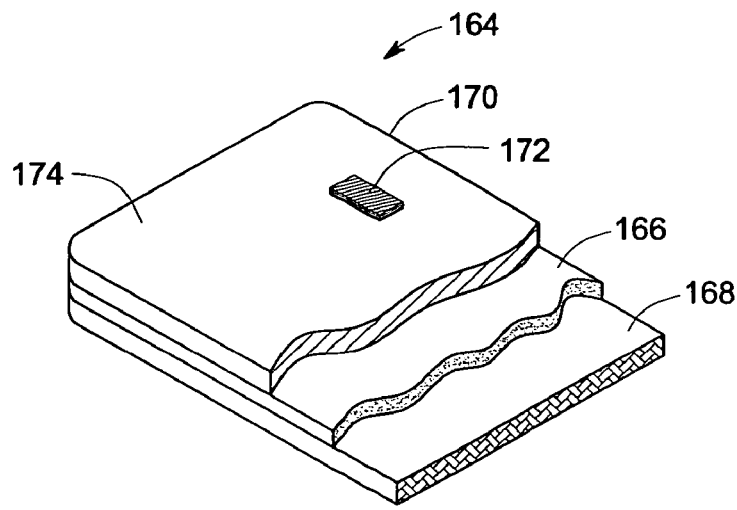
FIG. 16 is a partial perspective view of an identification card having a convertible material disposed on an optical layer and in one of the two functionality states in accordance with an exemplary embodiment of the invention.

FIG. 16 illustrates an optical article in the form of a card, such as an ID card 164. The card 164 employs an optical data layer 166 disposed on a substrate 168. The card 164 also includes a capping layer 170 which serves as protective covering of the optical data layer 166. The capping layer 170 includes an electro-chromic structure 172 disposed on the surface 174 of the capping layer 170, which is similar to the electro-chromic structure 148 (see FIGS. 14, 15) in function.

That is, upon interaction with electrical stimulus, the electro-chromic structure 172 may change the state of functionality of the card 164.

In alternate embodiments, the electro-chromic structure 148, 172 may include a bi-stable liquid crystal layer. In such embodiments, the electric field, or a combination of electric field with magnetic, or thermal energy may be applied to the electro-chromic structures 148 or 172 to alter the state of functionality of the optical article from the pre-activated state to the activated state.

Figure 17:
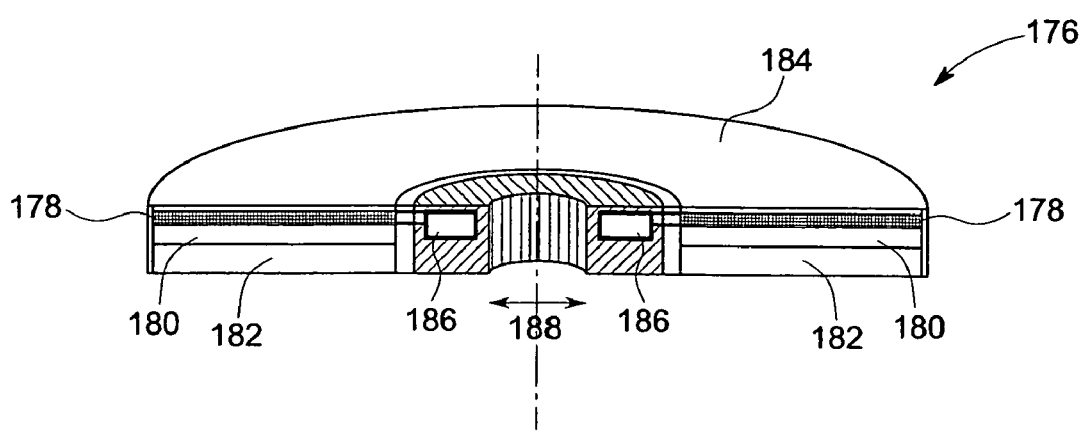
FIGS. 17-18 are cut away perspective views of an optical storage medium having an electro-chromic structure disposed within in accordance with exemplary embodiments of the invention.
Figure 18:
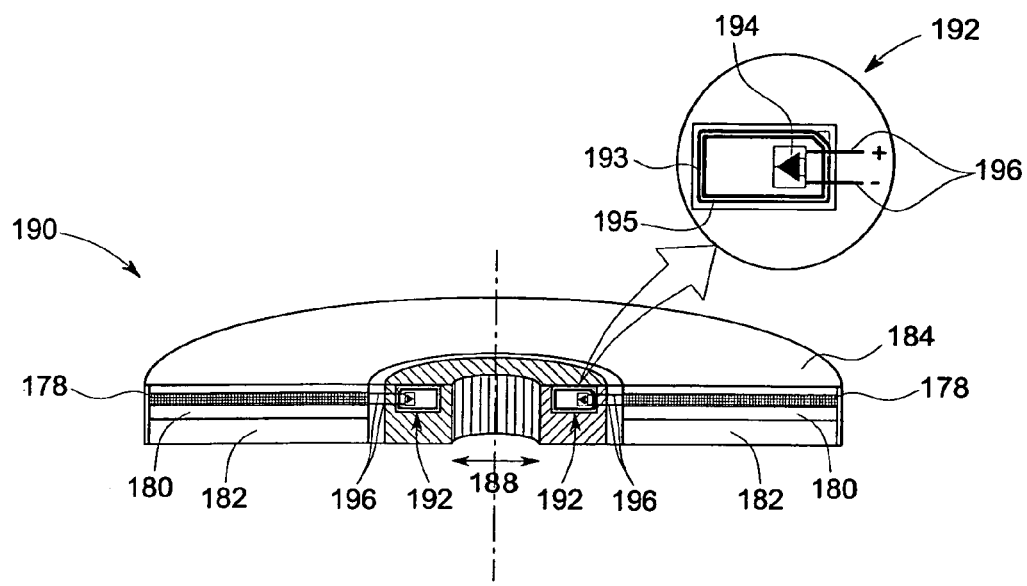

As noted above, the electro-chromic structure may be disposed inside the optical article. FIG. 17 and FIG. 18 illustrate alternate embodiments of optical storage media 176 and 190 having electro-chromic structure 178 disposed within. In the illustrated embodiments of FIGS. 17 and 18, the electro-chromic structures are coupled to a device, which may alter the external stimulus into electrical signal, which may then interact with the electro-chromic structures to alter the state of the optical storage media.

FIG. 17 is a cut away perspective view of an optical storage medium 176 illustrating the location of an electro-chrornic structure 178 relative to other layers, such as an optical data layer 180, a substrate 182 and a capping layer 184. The electro-chromic structure 178 may have a similar configuration of layers as structure 148 of FIG. 15. Similar to the electrical connections 156 of FIG. 15, converters 186 may be coupled to the electro-chromic layers of the electro-chromic structure 178 to provide electrical input to the structure 178. The converters 186 are an electrical device that may convert RF energy into voltage. The converters 186 include a Schottky diode coupled to a capacitor. Further the Schottky diode is also coupled to antenna dipoles. As illustrated, the converters 186 may be located in or proximate the inner hub area 188. In some embodiments, the circuitry of the converter may include a rectenna device.

FIG. 18 is a cut away perspective view of an optical storage medium 190. As with FIG. 17, the optical storage medium 190 illustrates the electro-chromic structure 178, the optical data layer 180, the substrate 182 and the capping layer 184. The optical storage medium 190 further includes an RF circuitry 192 having a Schottky diode 194 electrically coupled to the electro-chromic structure 178 via connectors 196. The RF circuitry 192 further includes an antenna 193 and a capacitor 195 as shown in the blown-up section. Although not illustrated, in an alternate embodiment, instead of being disposed inside the structure 178 of the medium 176, the RF circuitry 192 may be disposed on and coupled to the top surface of the medium 178. For example, the RF circuitry 192 may be disposed on the capping layer 184 and coupled to the electro-chromic structure 178 via connectors, such as connectors 196 which may pass through the thickness of the capping layer 184 to be coupled to the optical data layer 180.

Alternatively, the optical article, such as an optical storage medium 176 may employ an RFID tag, which may convert RF radiation into an electrical signal. Such an RFID tag may include radio circuitry as well as logic circuitry. In one embodiment, such an RFID tag may be embedded in the structure of the optical storage medium along with an electro-chromic structure. In this embodiment, the optical storage medium 176 may be activated by providing external radiation, such as RF or microwave radiation, to interact with the RFID tag. In another example, the electro-chromic structure 176 may be employed at the location of the data layer, which contains the tailored menu. As noted previously, the external radiation may be provided in the form of a pulse or a pulse sequence.

In other embodiments, the optical article, such as optical storage medium 142 or 176 may include several other mechanisms of converting the external RF or microwave radiation into an electrical signal. For example, the optical article may include a pair of coil antennas. These coil antennas may be similar to the antennas employed in an RFID tag. The first coil antenna of the pair may be responsive to a first resonant frequency, and the second coil antenna of the pair may be responsive to a second resonant frequency. One of the first or second frequencies interacts with the electro-chromic structure to render the structure transparent to the incident laser, and the second frequency interacts with the electro-chromic structure to render the structure opaque to the incident laser.

Alternatively, a pair of high inductance and low inductance coils may be employed to change the functionality of the optical article. The high and low inductance coils may produce electrical signals in response to external radiation, such as RF or microwave radiation. The electrical signals from the two coils may interact with the electro-chromic structure to render the optical article readable.

Figure 19:
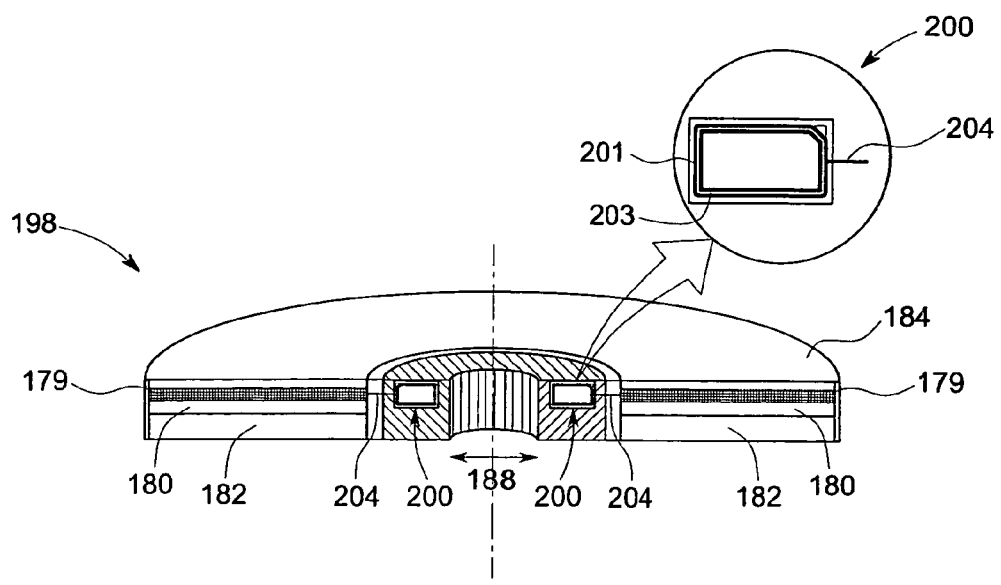
FIG. 19 is a cut away perspective view of an optical storage medium having a layer of thermo chromic material disposed within in accordance with exemplary embodiments of the invention.

FIG. 19 illustrates an embodiment of an optical storage medium 198 employing a layer 179 of a thermo-chromic layer, which is coupled to an RF circuitry 200. The RF circuitry 200 further includes an antenna 201, which is connected to a Nichrome wire 204. In turn, the Nichrome wire 204 is coupled to the layer 179. The Nichrome wire 204 may act as a heater to provide heat to the thermo-chromic material of the layer 179, the thermo-chromic material upon reaction with the heat may change color, thereby altering the state of functionality of the optical storage medium 198. The Nichrome wire 204 may be coupled to the anode of the RF circuitry 200. The RF circuitry 200 may optionally include a capacitor. In these embodiments, the antenna 201 may be exposed to the external electric field to charge the capacitor, subsequently, the capacitor may be discharged to transfer the current to the Nichrome wire 204, thereby heating the Nichrome wire 204.

Figure 20:
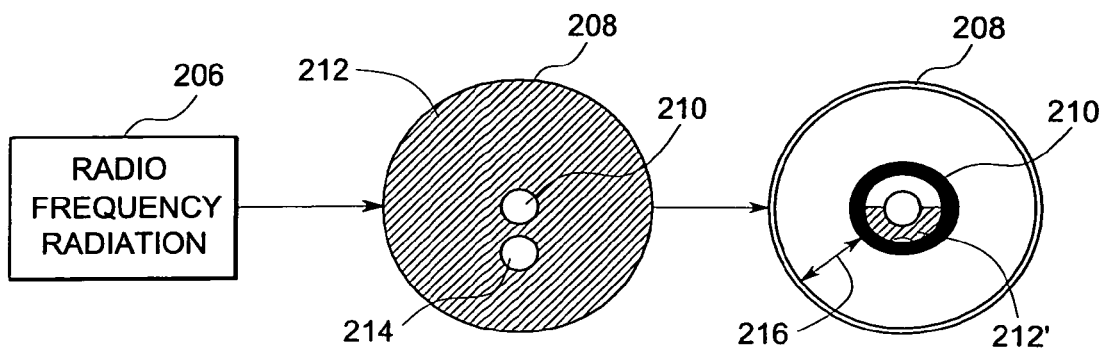
FIG. 20 is a diagrammatical representation of a method for disabling a tailored menu to change a functionality of an optical storage medium in accordance with an exemplary embodiment of the invention.

FIG. 20 illustrates a method of disabling the tailored menu of an optical storage medium 208 by employing an external stimulus, such as radio frequency radiation 206. In the pre-activated state, the optical storage medium 208 includes a directing material, such as a metal foil or conductive mask, 212 disposed on the entire surface or a portion of the optical storage medium 208, including the data storage region 216 and a portion of the inner hub 210. The directing material 212 may enclose one or two sides of the optical storage medium 208. Alternatively, the directing material 212 may be attached to an opaque substrate, the directing material 212 being inside the opaque substrate. The directing material 212 may include an opening 214 at a location, which employs the tailored menu. Upon exposure to RF radiation 206, the portion of the optical data layer beneath the opening 214 may be destroyed. With the optical data layer damaged, that particular portion of the optical data layer may not be able to reflect the incident laser. Hence, no valid optical signal may reach the reader until the optical incident laser has passed the physical location of the tailored menu. Further, the RF radiation may remove the directing material 212 from most of the parts of the optical storage medium 208 by, for example, evaporation. In some embodiments, a portion 212' of the directing material 212 may remain on the optical storage medium 208, which may be removed manually, without adversely affecting the optical storage medium 208. In some embodiments, the user may remove the directing material 212 from the optical storage medium 208 in the activated state prior to playing the disc.

Figure 21:
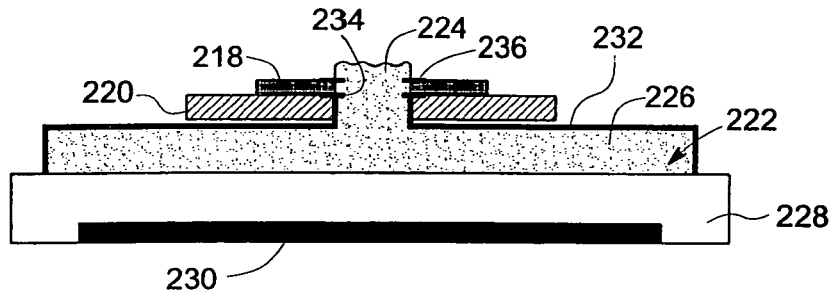
FIG. 21 is a cross-sectional view of an arrangement for applying voltage to an electro-chromic structure in accordance with an exemplary embodiment of the invention.

FIG. 21 is a cut away schematic view of an arrangement for providing external power supply to an electro-chromic structure 218 coupled to an optical article 220. The optical article 220 is housed inside a case or packaging 222, which has a central region 224 and a peripheral region 226. The packaging 222 is placed on and operatively coupled to a charging pad 228, which includes electrified rails 230. The electrified rails 230 are coupled to an external power supply (not shown) such that when the external power supply is turned on, the electrical current passes through the electrified rails 230 and charges the charging pad 228. This charge is then transferred to the electro-chromic structure 218 by employing a conductive path 232 that is coupled to electrodes 234. Further, electrodes 236 are used to electrically couple the electro-chromic structure 218 to the packaging 222.

Figure 22:
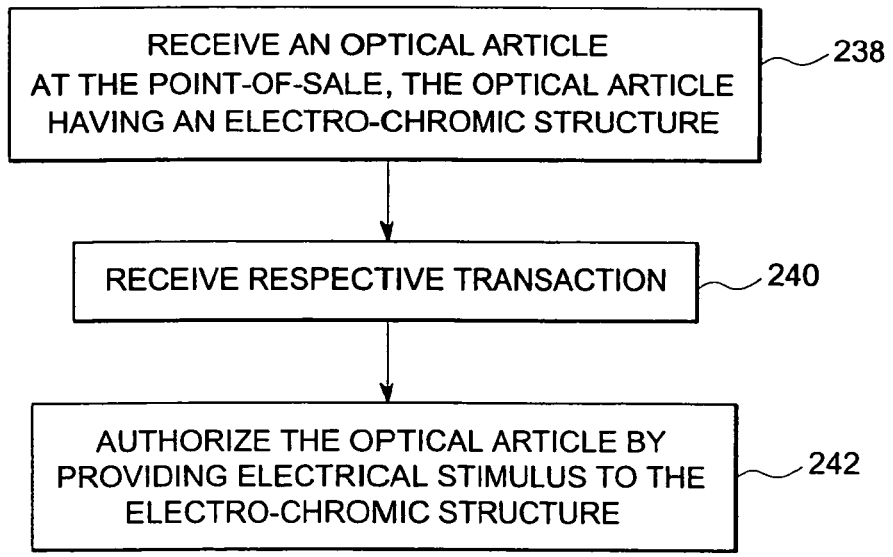
FIG. 22 is a flow chart illustrating a business method for the sale of an optical storage medium in accordance with an exemplary embodiment of the invention.

FIG. 22 is a flow chart illustrating a method of transaction of an optical article having an electro-chromic structure, such as structures 148, 172, or 176. At block 238, the optical article, such as optical article 142, 164, 176 or 192, is received at the authorization location. At block 240, a respective transaction for the optical article is received. Further, at block 242, the optical article is authorized as described above with reference to FIGS. 14-16. Additionally, verification of the authorization may be conducted on the optical article as described above with reference to FIGS. 8 and 13.

EXAMPLE 1

Bleachable dyes were incorporated into extruded and molded polycarbonate matrix, PC 175 obtained from GE Plastics (Mt Vernon, Ind.). The weight percent of the polycarbonate matrix was 94 percent. Methylene blue tri-hydrate obtained from Wilson Laboratories (Mumbai, India) was blended with polycarbonate matrix along with 0.06 weight percent heat stabilizer, Irgafos 168 obtained from Ciba-Geigy and 0.26 weight percent mold release agent, pentaerythritol tetrastearate obtained from Lonza. The blend was extruded using an extruder ZSK-25 Twin Screw obtained from W&P-Warner & Pfleiderer. 400 mg of dye was loaded along with 1 Kg polycarbonate matrix, 600 mg of heat stabilizer and 2600 mg of mold release agent. The temperature in the extruder was maintained between 275° C. to 295° C., torque between 60-65 units, rpm of 300, and feed rate of about 118 Kg/h.

The samples so formed were then exposed to a tungsten halogen lamp source, 120 Watt Halogen XTRA Capsylite PAR38® floodlight obtained from Osram Sylvania product, Inc. (Winchester, Ky.). A 3 inch distance was maintained between the source and sample disc. Color and transmission measurements were done on a Gretag-Macbeth 7000A spectrophotometer. Data was recorded using a 2 degree observer setting and a D65 source in the transmission mode. Data on the unexposed chip was recorded as data at time=0. Subsequent measurements were taken at 30 minutes and 60 minutes intervals. The variation in percentage transmittance at 650 nm was observed as a function of exposure time. An increase in percent transmittance of 14 units over a period of 120 minutes was seen as the lamp bleached the dye.

EXAMPLE 2

Figure 23:
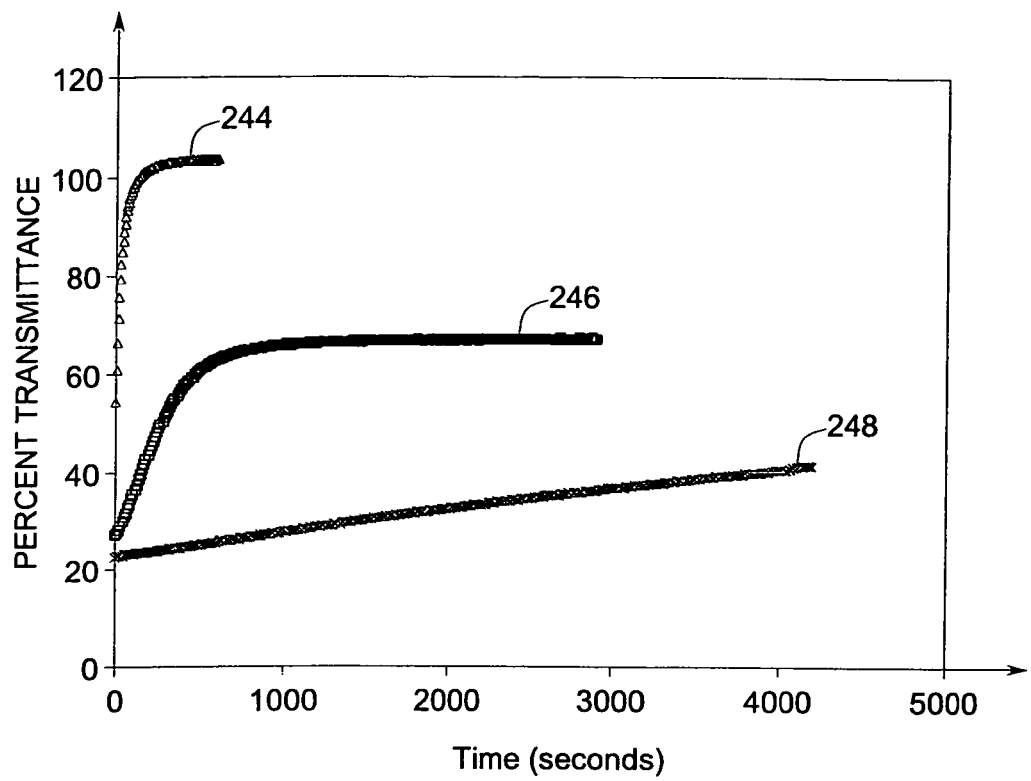
FIG. 23 is a graphical representation of the change in percent transmittance of a photo-bleachable dye upon interaction with an external stimulus.

Samples were prepared by coating a series of DVDs using polymethyl methacrylate based coatings, Elvacite 2008 obtained from Lucite International Inc (Parkersburg, W.Va.) containing 0.1 percent to 2 percent of a photobleachable dye. Examples of photobleachable dyes include methylene blue, azure B, cryptocyanine, IR125, H. W. Sands 7995. The thickness of the coatings was in a range from about 5 micrometers to about 10 micrometers. The samples were exposed to white light from a 6.5 W tungsten lamp, model LS-1obtained from Ocean Optics (Dunedin, Fla.). The lamp with color temperature of 3100 K was connected to a fiber optic probe. The probe was positioned about 1 cm above the PMMA/dye film. Reflectance spectra were captured via an USB 2000 spectrometer obtained from Ocean Optics (Dunedin, Fla.) as a function of exposure time of the samples to the white light. Plots showing the change in reflectance at 650 nm versus exposure time are illustrated in FIG. 23. The ordinate shows the values of percent reflectance with reference to time shown on the abscissa. FIG. 23 specifically shows a plot of two dyes showing relatively faster bleaching, including H W Sands MSA3367 as shown by reference numeral 244 and diarylethene as shown by reference numeral 246. The diarylethene dye molecule is an example of a class of photochromic dyes that can convert from a blue color (strong absorbance at 650 nm) to a yellow color (weak absorbance at 650 nm) upon exposure to visible (eg. 650 nm) light. Cryptocyanine obtained from Aldrich Chemicals (Milwaukee, Wis.), another dye used in the experiment showed relatively slower bleaching rates as illustrated by reference numeral 248. The characteristic bleaching time of the various dyes coated on these samples is provided in Table 1.

TABLE 1

Time vs. reflectivity

| Dye | Time to 45 percent reflectivity (Seconds) |
|---|---|
| MSA3367 | 100 |
| Diarylethene | 300 |
| Cryptocyanine | 4000 |

EXAMPLE 3

Samples were prepared by spin coating a series of DVDs with polymethyl methacrylate based coatings having photobleachable dyes. The concentration of the dye in the original solution before spin coating was varied between 1 percent to 14 percent. Methylene blue, and 2.5 percent and 4 percent aluminum phthalocyanine chlorides obtained from Aldrich Chemical (Milwaukee, Wis.) were used as dyes. Regions of DVDs were then exposed to a 650 nm laser diode using various laser powers in a range from about 10 mili-watt to about 75 mili-watt, while spinning the disc at 2 to 30 rpm. UV-visible spectra of the exposed and unexposed regions of the DVDs were then measured. Also, percentage transmittance at 650 nm and at 780 nm were measured for these two regions of the DVDs. Table 2 provides the values of reflectivity for different exposure conditions of the dyes. Methylene blue coated DVD demonstrated a significant increase in reflectance at 650 nm after exposure to the red laser.

TABLE 2

Reflectivity as a function of Exposure Conditions and incident laser

| | Exposure Conditions | | | | |
|---|---|---|---|---|---|
| Dye | Current (mA) | Power (mW) | RPM | % Reflectivity at 650 nm | % Reflectivity at 780 nm |
| 4% Aluminum Phthalocyanine Chloride | 40 | 11 | 30 | 6.5 | 13.2 |
| | 45 | 16 | 30 | 7.5 | 14.8 |
| | 50 | 22 | 30 | 8.0 | 16.5 |
| | 60 | 32 | 30 | 8.5 | 17.9 |
| | 70 | 43 | 30 | 8.4 | 17.7 |

TABLE 2-continued

Reflectivity as a function of Exposure
Conditions and incident laser

Exposure Conditions

| Dye | Current (mA) | Power (mW) | RPM | % Reflectivity at 650 nm | % Reflectivity at 780 nm |
|---|---|---|---|---|---|
| | 80 | 53 | 30 | 12.7 | 24.8 |
| | 80 | 53 | 2 | 8.5 | 49.8 |
| 2.5% | 40 | 11 | 30 | 8.2 | 13 |
| Aluminum | 50 | 22 | 30 | 9.1 | 12.9 |
| Phthalo- | 60 | 32 | 30 | 9.7 | 14.4 |
| cyanine | 70 | 43 | 30 | 10 | 15.2 |
| Chloride | 80 | 53 | 30 | 10.5 | 18.8 |
| | 80 | 53 | 2 | 6.5 | 43.4 |
| 1% | Unbleached | | | 9.1 | 95.7 |
| Methylene | 50 | 22 | 30 | 8.0 | 85.6 |
| blue | 80 | 53 | 30 | 9.2 | 52.9 |
| | 100 | 73 | 30 | 8.0 | 38.1 |
| | 100 | 73 | 2 | 22.9 | 65.2 |

EXAMPLE 4

A diarylethene dye was dissolved (at 0.5 weight percent concentration) in the UV-curable adhesive used to manufacture a DVD. Regions of the disc were then exposed to a 650 nm laser diode using varying laser powers while spinning the disc at 2 to 30 rpm. The regions of the disc are effectively bleached using laser powers greater than about 35 mA or greater than about 5 mW. This is a laser power that is commonly achievable in consumer DVD players and drives.

EXAMPLE 5

A DVD was spin-coated with a polymethyl methacrylate coating containing a diarylethene dye. The DVD was first exposed to visible light (using a 100 W halogen lamp with a 400 nm cutoff filter) to effectively bleach the diarylethene dye to its colorless form. The DVD was tested in an electrical tester, Lite-On SOHW 1673 DVD-RW drive using Kprobe software. The disc was then exposed to UV light using a photomask to create first three 3 mm-diameter spots and second to three 2 mm-diameter spots to create regions in the disc coating in which the diarylethene dye is converted to its blue colored form. Then, the discs were exposed to visible light to bleach the dye, thereby removing the blue spots. This example showed: 1). the blue spots created by the diarylethene dye create errors, and 2) bleaching of the dye to remove the blue spots reduces PO (parity errors for outer array) errors. It should be appreciated that if PO errors are located at appropriate sectors (logical block addresses) the playability of the disc may be affected. In some cases, if enough PO errors are present or if the PO errors occur at or near the table of contents region of the disc, the disc will not be bootable. Then, upon bleaching of the disc and removal of the PO errors, the disc will become bootable and readable.

EXAMPLE 6

Figure 24:
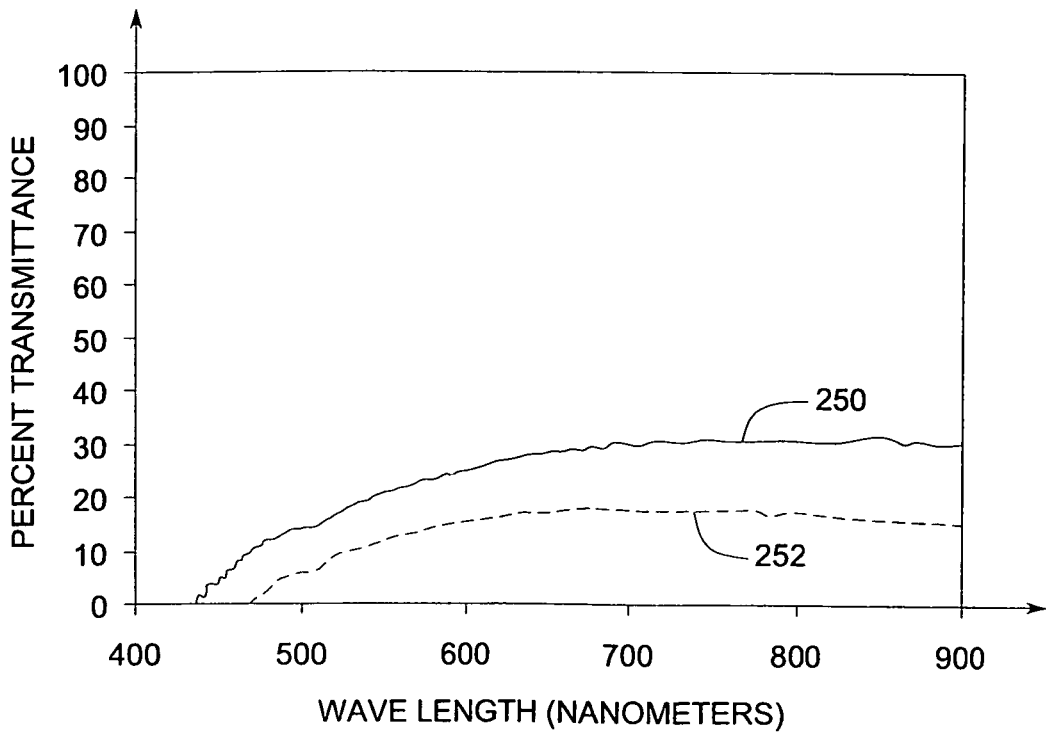
FIG. 24 is a graphical representation of the change in percent transmittance of an electro-chromic structure upon interaction with an electrical stimulus.

A first film of electro-chromic material, Orgacon EL350 having dimensions 2 cm×2 cm was obtained from Agfa-Gevaert NV, SFC Division, Septestraat (27 B-2640 Mortsel, Belgium). The film had a conductive and a non-conductive side. The conductive side of the film was coated with a drop of an ionic conductive material, butylmethylimidazolium bromide (BMIMBr) obtained from Aldrich Chemical (Allentown, Pa.). A second film of Orgacon EL350 was placed on the electrolyte drop causing the drop to spread evenly between the two films. Excess electrolyte was wiped clean from the edges of the sandwiched Orgacon EL350 films. The ionic conductive material, in this case BMIMBr, served as an electrolyte and the two electro-chromic layers of Orgacon EL350 as anode and cathode. The electro-chromic layers where attached to a reflective surface of a DVD. Electrical contact with the anode of an external power supply was made with the initial Orgacon EL350 film, and electrical contact with the cathode of an external power supply was made with the second Orgacon EL350 film. When current flowed from the power supply to the electro-chromic layer, a noticeable blue color forms in the electro-chromic layers. The transmissivity of the bleached and colored layers were measured. FIG. 24 illustrates UV-visible spectra 250 and 252 of the electro-chromic structure showing percent transmittance on ordinate axis and wavelength on abscissa. The plot 250 indicates the percent transmittance prior to application of voltage and plot 252 illustrates the percent transmittance after application of the voltage to the electro-chromic structure. The graphs indicate reduction in percent transmittance or increase in reflectivity after application of DC voltage of about 1 Volt to the electro-chromic layers.

EXAMPLE 7

Malachite green and bromocresol dye Malachite Green (CAS: 96-49-1, Product No M0050, Rankem, Ranbaxy) were incorporated in polycarbonate by solvent casting method. 0.5 gm of PC 175 was dissolved in 40 ml of Dichloromethane and to that was added 5 mg of malachite green. The solution was transferred into petri plates and was allowed to stand still undisturbed for 4-5 hours. The PC film was removed carefully for photo bleaching experiments. The composition of the blend is shown in Table 3.

TABLE 3

Blend Composition

| Component | Details | Weight Percent |
|---|---|---|
| PC175 | Polycarbonate with a molecular weight of about 40,000 daltons obtained from GE Plastics | 99 |
| Dichloromethane | Solution of 0.5 grams of polycarbonate in 40 mililiters of methylene chloride | |
| Malachite Green | CAS: 96-49-1 Product No M0050, obtained from Rankem, Ranbaxy laboratories | 1 |

The film samples were recorded for their transmission data in their unexposed state on Gretag-Macbeth Color Eye 7000A spectrophotometer. Further sample films were exposed to a Xenon lamp source with 0.75 W/m2 at 340 nm wavelength, (Xenon Weather-ometer Ci5000, Atlas, US). Transmission measurements of exposed samples were recorded on a Gretag-Macbeth Color Eye 7000A spectrophotometer. Data was recorded using a UV D65 source in the transmission mode. Data on the unexposed sample were recorded as data at time=0 minutes. Subsequent measurements were taken at 5, 15, 20, 25, 30, 45, 60 minutes intervals as shown in Table 4 below. The variation in percentage transmittance at 640 nm is a function of exposure time. An increase in percent transmittance of 55 units over a period of 60 minutes is seen as the lamp bleaches the dye.

TABLE 4

Percent Transmittance at 640 nanometer

| Time (min) | Percent Transmittance at 640 nanometer wavelength |
|---|---|
| 0 | 2.91 |
| 5 | 3.423 |
| 15 | 7.083 |
| 20 | 21.774 |
| 25 | 29.241 |
| 30 | 43.283 |
| 45 | 53.112 |
| 60 | 57.934 |

Methods for bleaching dyes incorporated into a solvent cast film in a polycarbonate matrix are described in this example. Bromophenolblue (CAS: 115-39-9, sd fine) was incorporated in polycarbonate by solvent casting method. 0.5 gm of PC 105 was dissolved in 40 ml of Dichloromethane and to that was added 1 mg of BromoPhenolblue (CAS: 115-39-9, sd fine), 1 mg of 4-(Dimethyl Amino)-Pyridine (DMAP, CAS: 1125-58-3) and 25 mg of Photo acid generator, PAG, Tris-(4-tert-butylphenyl)sulfonium triflate (TBPT, CAS: 134708-14-8, Aldrich). The solution was transferred into petri plates and was allowed to stand still undisturbed for 4-5 hours. The PC film was removed carefully for photo bleaching experiments. The composition of the blend is shown in Table 5.

TABLE 5

Blend Composition

| Component | Composition | Weight Percent |
|---|---|---|
| PC105 | Polycarbonate with molecular weight of 64,000 daltons obtained from GE Plastics | 94.6 |
| Dichloromethane | Solution of 0.5 grams of polycarbonate in 40 mililiters of methylene chloride | |
| DMAP | 4-(Dimethyl Amino)-Pyridine | 0.2 |
| TBPT | Photo acid generator | 5 |
| Bromophenol blue | CAS: 1122-58-3 obtained from Aldrich Chemicals | 0.2 |

Transmission data for the film samples were recorded in their unexposed state using a Gretag-Macbeth Color Eye 7000A spectrophotometer. Further sample films were exposed to a Xenon lamp source with 0.75 W/m2 at 340 nm wavelength, (Xenon Weather-ometer Ci5000, Atlas, US). Transmission measurements of exposed samples were recorded on a Gretag-Macbeth Color Eye 7000A spectrophotometer. Data was recorded using a UV D65 source in the transmission mode. Data on the unexposed sample was recorded as data at time=0 minutes. Subsequent measurements were taken at 15 and 30 minutes intervals as shown in Table 6 below. The variation in percentage transmittance at 610, 620 and 630 nm is a function of exposure time. An increase in percent transmittance of 64 units over a period of 30 minutes is seen as the lamp bleaches the dye. Although example 7 illustrates the concept in a solvent cast film, similar experiments may also be done in molded parts containing the bleachable dye.

TABLE 6

Percent Transmittance at 610, 620 and 630 nm

| Time (minutes) | Percent transmittance at 610 nm | Percent transmittance at 620 nm | Percent transmittance at 630 nm |
|---|---|---|---|
| 0 | 7.052 | 10.823 | 24.646 |
| 15 | 61.72 | 66.619 | 74.93 |
| 30 | 71.318 | 74.886 | 80.472 |

EXAMPLE 8

A 13.56 MHz wireless thermo-chromic circuit is fabricated using standard lithography techniques in the clamp area of a DVD. The rectenna portion of the circuit employs a circular coil antenna, a capacitor, and a Schottky bridge diode. The dc terminal leads from the Schottky diode are connected to the anode and cathode of an electro-chromic device (ECD) situated over an active sector of the DVD. The impedance of the ECD load is matched to the rectenna by control of the dimensions of the ECD to maximize the efficiency of RF to DC conversion. The ECD is fabricated by spin casting two layers of UV treated (360 nm) PEDOT-PSS doped with 0.5 wt % 1,2-bis(5',2'-di(thiophen-2-yl)thien-3'-yl)perfluorocyclopentene separated by a layer of amorphous polyethylene oxide doped with 10 wt % lithium trifluoromethane sulfonate. Initially, the DVD is unplayable in the dark blue state owing to the optical absorption of the ECD at 650 nm. When the disc containing the ECD is exposed to 13.56 MHz RF, bleaching of the ECD at 650 nm is observed as evidenced by a transition of the dye from the initial dark blue color to pale yellow color. The DVD is playable in the bleached (activated) state.

EXAMPLE 9

A 13.56 MHz wireless thermo-chromic device (TCD) is fabricated using standard lithography techniques in the clamp area of a DVD. The rectenna portion of the device employs a circular coil antenna, a capacitor, and a Schottky bridge diode. The dc terminal leads from the Schottky diode are connected to 1 mm×2 mm strands of interwoven Nichrome and copper wire situated within 2 mm of an active sector of the DVD. The impedance of the Nichrome and copper load are matched to the rectenna by control of the wire dimensions to maximize the efficiency of RF to DC conversion. A thermochromic layer of Thermax SC-155 (Thermographic Measurements Co. Ltd, Flintshire, UK) with a transition temperature of 155° C. is deposited on an active sector of the DVD near the interwoven Nichrome and copper strands. Initially, the DVD is unplayable in the pre-activated state owing to the optical absorption of dark blue layer of SC-155 at 650 nm. When the disc containing the TCD is exposed to 13.56 MHz RF, bleaching of the thermochromic layer at 650 nm is observed as evidenced by a transition of the layer from the initial dark blue color to a brown color as a result of resistive heating in the Nichrome/copper strands. The DVD is playable in the bleached (activated) state.

EXAMPLE 10

A DVD was partially covered in a removable conductive mask comprised of heavy aluminum foil tape. The foil covered both surfaces of the DVD with the exception of a 18 mm diameter hole. The masked DVD was placed in a commercial 1000 W delivered, 1.5 kW consumed) microwave oven (Sharp Carousel R4A38) and exposed to 2.45 GHz radiation for 2-3 sec. The DVD was removed from the oven and the aluminum foil was removed. Optical microscopy performed on the DVD indicated that significant damage (micro-cracks) were formed in the reflective layer of the DVD at the unmasked region, and no damage within the 18 mm hole in the foil. Another DVD was masked with aluminum foil and exposed to microwave in a similar fashion to create a damaged region near the table of contents region of the DVD. The resulting DVD was unplayable. Other DVDs can be masked with foil and exposed to microwave to damage specific regions in the disc to make specific data sectors in the disc unplayable. It can be appreciated that when this is combined with a tailored menu, this method of masking the disc with a removable conductive overlay and exposing it to microwave can be used to activate the disc. That is, when appropriate data sectors are destroyed via this method, the tailored menu will allow the predetermined content (e.g., the movie) on the disc to be playable.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include some of the described embodiments. Accordingly, the invention is not to be seen as limited by the foregoing description, but is only limited by the scope of the appended claims.

What is claimed as new and desired to be protected by Letters Patent of the United States is:

1. An optical article that can transform from a pre-activated state of functionality to an activated state of functionality, comprising:
   an optical data layer for storing data, wherein said data is read from said optical data layer in said activated state of functionality;
   a radio frequency circuitry coupled to the optical article;
   an external radiation source for generating an external stimulus which interacts with the radio frequency circuitry to produce a signal, wherein said signal comprises a thermal signal, an electrical signal, or both;
   wherein the radio frequency circuitry is disposed on a detachable label; wherein said detachable label has an adhesive disposed thereon, wherein a bond strength of said adhesive can alter upon interaction with the external stimulus, wherein said detachable label is coupled to the optical article and being responsive to said external stimulus, said detachable label being in optical communication with said optical data layer for altering the optical article from the pre-activated state of functionality to the activated state of functionality upon interaction with said external stimulus;
   a convertible material in operative association with said radio frequency circuitry; and
   wherein said convertible material comprises an adhesive, a color-shift dye, a photovoltaic material, a magnetic material, a magneto-optical material, a phase-change material, dye aggregates, nanoparticles or combinations thereof.

2. The optical article of claim 1, wherein said convertible material renders an optical state change, wherein said optical state change comprises at least one from the group consisting of layer reflectivity, single layer reflectivity, dual layer reflectivity, refractive index, birefringence, polarization, scattering, absorbance, thickness, optical path length, and position.

3. The optical article of claim 1, wherein said pre-activated state is characterized by an optical reflectivity of at least a portion of the optical article being less than about 45 percent and said activated state is characterized by an optical reflectivity of at least a portion of the optical article being more than about 45 percent.

4. The optical article of claim 1, wherein an optical reflectivity of the optical article in both said pre-activated and activated states is more than about 45 percent and readability of the optical article in said pre-activated state is available for a finite period of time.

5. The optical article of claim 1, wherein the optical article comprises one of a CD, a DVD, a HD-DVD, a Blu-ray disc, a near field optical storage disc, a holographic storage medium or another like volumetric optical storage medium.

6. The optical article of claim 1, wherein the optical article comprises an identification card, a passport, a payment card, a driving license, or a personal information card.

7. The optical article of claim 1, wherein said radio frequency circuitry comprises a programmable chip, a heater circuitry, a micro-heater, or a capacitor.

8. The optical article of claim 1, wherein said radio frequency circuitry comprises a first coil antenna and a second coil antenna, wherein said first coil antenna receives a first frequency, and said second coil antenna receives a second frequency different from said first frequency.

9. The optical article of claim 1, wherein said radio frequency circuitry comprises a radio frequency identification tag.

10. The optical article of claim 1, wherein said radio frequency circuitry comprises a built in coil for converting said external stimulus into said signal.

11. The optical article of claim 1, wherein said radio frequency circuitry is detached from the optical article upon completion of said activated state.

12. The optical article of claim 1, wherein said convertible material detachably couples said radio frequency circuitry to the optical article.

13. The optical article of claim 1, wherein said external stimulus comprises radio frequency radiation, microwave radiation, or both.

14. The optical article of claim 1, wherein at least a portion of said optical data layer comprises a tailored menu, wherein said tailored menu renders the optical article un-readable in said pre-activated state of functionality.

15. The optical article of claim 14, wherein said tailored menu facilitates display of a message upon interaction with an incident laser.

16. The optical article of claim 1, further comprising a packaging for the optical article, wherein said packaging enables said external stimulus to be directed towards at least a portion of said convertible material.

17. The optical article of claim 16, wherein said packaging comprises a window aligned with said at least a portion of said convertible material.

18. The optical article of claim 1, wherein said convertible material is disposed in a discrete area of the optical article, a continuous layer extending across a portion of the optical article, or a patterned layer extending across a portion of the optical article.

* * * * *

UNITED STATES PATENT AND TRADEMARK OFFICE
CERTIFICATE OF CORRECTION

PATENT NO. : 7,653,919 B2  Page 1 of 1
APPLICATION NO. : 11/286413
DATED : January 26, 2010
INVENTOR(S) : Potyrailo et al.

It is certified that error appears in the above-identified patent and that said Letters Patent is hereby corrected as shown below:

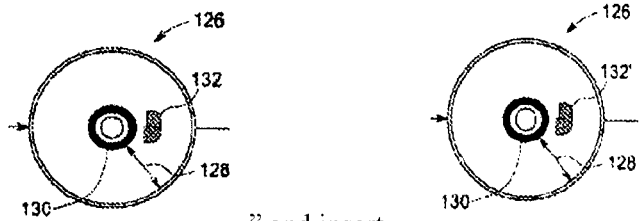

In Fig. 12, Sheet 5 of 10, delete " " and insert -- -- , therefor.

In Column 25, Line 22, delete "electro-chrornic" and insert -- electro-chromic --, therefor.

In Column 31, Line 26, delete "1125-58-3)" and insert -- 1122-58-3) --, therefor.

Signed and Sealed this

Sixteenth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,653,919 B2  Page 1 of 1
APPLICATION NO. : 11/286413
DATED : January 26, 2010
INVENTOR(S) : Potyrailo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 882 days.

Signed and Sealed this

Twenty-eighth Day of December, 2010

David J. Kappos
*Director of the United States Patent and Trademark Office*